(12) United States Patent
Harrison et al.

(10) Patent No.: US 10,313,088 B2
(45) Date of Patent: Jun. 4, 2019

(54) SYSTEM AND METHOD FOR CHARACTERIZING DYNAMIC INTERFERERS IN ADVANCED RECEIVERS

(71) Applicant: Telefonaktiebolaget LM Ericsson (publ), Stockholm (SE)

(72) Inventors: Robert Mark Harrison, Grapevine, TX (US); Mats Folke, Vällingby (SE); Shiwei Gao, Nepean (CA); Lars Lindbom, Karlstad (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 15/501,343

(22) PCT Filed: Aug. 7, 2015

(86) PCT No.: PCT/EP2015/068228
§ 371 (c)(1),
(2) Date: Feb. 2, 2017

(87) PCT Pub. No.: WO2016/020513
PCT Pub. Date: Feb. 11, 2016

(65) Prior Publication Data
US 2017/0237542 A1 Aug. 17, 2017

Related U.S. Application Data

(60) Provisional application No. 62/034,587, filed on Aug. 7, 2014.

(51) Int. Cl.
*H04L 5/00* (2006.01)
*H04W 52/24* (2009.01)
(Continued)

(52) U.S. Cl.
CPC ............ *H04L 5/0073* (2013.01); *H04L 5/005* (2013.01); *H04L 5/0035* (2013.01);
(Continued)

(58) Field of Classification Search
CPC ..... H04L 5/0073; H04L 5/005; H04L 5/0035; H04L 5/0048; H04L 5/0091; H04W 72/082; H04W 72/06; H04W 52/241
(Continued)

(56) References Cited

U.S. PATENT DOCUMENTS

2016/0226538 A1* 8/2016 Kim .................. H04B 1/123
2017/0071005 A1* 3/2017 Kato .................. H04B 1/707
2017/0126383 A1* 5/2017 Yamada ............. H04W 72/08

OTHER PUBLICATIONS

3GPP TS 36.213 version 11.1.0 Release 11 Published by 3GPP (Year: 2012).*

(Continued)

*Primary Examiner* — Brian T O Connor
(74) *Attorney, Agent, or Firm* — Sage Patent Group

(57) ABSTRACT

In one example embodiment, a method for identifying interfering physical channel configurations and cell-specific reference signals (CRSs) for the characterization of dynamic interferers includes constructing configuration indications. Each configuration indication may include a physical cell identity, antenna port information for a cell-specific reference signal (CRS), and an identification of a channel state information reference signal (CSI-RS). First and second configuration indications may be transmitted to a first wireless device. A first physical channel may be transmitted to the first wireless device. A second physical channel transmitted from a second network node may interfere with the first physical channel and be identifiable at least in part based on the first and second configuration indications. The first and second configuration indications may include a same physical cell identity and same antenna port information.

30 Claims, 10 Drawing Sheets

(51) Int. Cl.
*H04W 72/06* (2009.01)
*H04W 72/08* (2009.01)

(52) U.S. Cl.
CPC ......... *H04W 52/241* (2013.01); *H04W 72/06* (2013.01); *H04W 72/082* (2013.01); *H04L 5/0048* (2013.01); *H04L 5/0091* (2013.01)

(58) Field of Classification Search
USPC ........................................................ 370/329
See application file for complete search history.

(56) References Cited

OTHER PUBLICATIONS

Title: Discussion on Higher Layer Signaling for NAICS; Source: Intel Corporation; 3GPP TSG RAN WG1 Meeting #77; Seoul, Korea (R1-142014)—May 19-23, 2014.

Title: Discussion on Higher-Layer Signalling for NAICS; Source: Samsung; 3GPP TSG RAN1 #77; Seoul, Korea (R1-142125)—May 19-23, 2014.

Title: Higher-Layer Signaling for NAICS; Source: Ericsson; 3GPP TSG-RAN WG1 #77; Seoul, Korea (R1-142320)—May 19-23, 2014.

Title: Higher Layer Signaling of TM10 DMRS Properties for NAICS; Source: Ericsson; 3GPP TSG RAN WG1 Meeting #77; Seoul, Korea (R1-142323)—May 19-23, 2014.

Title: Analysis of Semi-Static Parameters for Blind Detection; Source: Ericsson; 3GPP TSG-RAN WG4 Meeting #71; Seoul, Korea (R1-142737)—May 19-23, 2014.

Title: Discussion on Semi-Static Parameters for NAICS; Source: Qualcomm Incorporated; 3GPP TSG-RAN WG4 Meeting #71; Seoul, Korea (R4-143578)—May 19-23, 2014.

International Search Report for International application No. PCT/EP2015/068228—Oct. 23, 2015.

\* cited by examiner

SYSTEM AND METHOD FOR CHARACTERIZING DYNAMIC INTERFERERS IN ADVANCED RECEIVERS

PRIORITY

This non-provisional application is a U.S. National Stage Filing under 35 U.S.C. § 371 of International Patent Application Serial No. PCT/EP2015/068228 filed Aug. 7, 2015, and entitled "System And Method For Characterizing Dynamic Interferers In Advanced Receivers" which claims priority to U.S. Provisional Patent Application No. 62/034,587 filed Aug. 7, 2014, both of which are hereby incorporated by reference in their entirety.

TECHNICAL FIELD

Particular embodiments relate generally to wireless communications and more particularly to a system and method for characterizing dynamic interferers in advanced receivers.

BACKGROUND

LTE supports assistance signaling for wireless devices, also known as User Equipment (UE), capable of Cell-specific Reference Signal interference cancellation (CRS-IC). Wireless devices using Network Assisted Interference Cancellation and Suppression (NAICS) techniques may typically include advanced, often nonlinear, receivers that cancel and/or suppress transmissions from interfering cells. Such wireless devices determine interference parameters in order to use their advanced reception capabilities. The parameters are determined through the assistance signaling and/or by making estimates of (i.e., 'blindly detecting') the interference parameters. The complexity of blind detection generally increases (and the reliability of blind detection degrades) with the number of parameters and the number of possible values of the parameters.

Dynamic point selection (DPS) may also be supported for NAICS wireless devices. In this case, it can be desirable to identify the transmitted Physical Downlink Shared Channels (PDSCHs) in a transmission point (TP) specific manner. Transmission Mode 10 (TM10) wireless devices are configured with Demodulation Reference Signal (DMRS) identifiers (that is, $n_{ID}^{DMRS,i}$, also called configurable cell IDs, or "CCID"s herein) that identify the PDSCH intended for the wireless device. Given the similarity of this TP-specific association of CCIDs to cell IDs, a reasonable number for the points that the wireless device should track is the number of cells that are tracked in Rel-11, which is eight. With two $n_{SCID}$ values, then the maximum number of CCIDs the wireless device should be provided NAICS assistance for should be 2*8=16. Therefore, NAICS wireless devices may have to blindly detect up to 16 different CCIDs unless additional information can be used to exclude candidate CCIDs for NAICS reception.

LTE TPs may use the same physical cell ID ('shared cell' operation) or different cell IDs. When Dynamic Point Section (DPS) is used in shared cell operation, a wireless device can still receive a PDSCH because the CCID is used to identify the PDSCH, rather than the cell ID. Therefore NAICS assistance signaling cannot rely only on the physical cell ID to associate interferer parameters with the interfering transmitter. Accordingly, even where the physical cell ID, number of CRS antenna ports and MBSFN subframe configuration parameters for one or more neighbor cells is known, it is insufficient assistance for NAICS wireless devices that cancel LTE physical channels with rapidly varying information content such as a PDSCH with varying spatial multiplexing rank or PDSCH transmitted using a precoding derived from CSI feedback.

NAICS wireless devices that cancel interferers generally demodulate the interfering physical channel. This implies that they should be able to determine which parts of an interfering transmission contain the physical channel, as opposed to e.g. reference signals. In LTE Rel-11, physical downlink shared channels and cell-specific reference signals (CRS-RS) are transmitted in different resource elements on a given cell or TP, and so NAICS Wireless devices should know the CRS configuration of the interferer they are attempting to cancel. Similarly, TM9 and TM10 PDSCHs do not occupy resource elements carrying CSI-RS from the same cell or TP, and so in some cases it can be beneficial for a NAICS wireless device to know the CSI-RS configuration of a TM9 or TM10 interferer.

Wireless devices receiving TM10 PDSCHs can be configured to receive non-zero power (NZP) CSI-RSs and zero power (ZP) CSI-RSs. While a Rel-11 wireless device may be configured to receive 3 NZP CSI-RSs, only one NZP CSI-RS is likely to be transmitted from a given TP. The TP will generally not transmit in Resource Elements (REs) corresponding to the other two NZP CSI-RSs, in order to avoid interfering with the CSI-RSs transmitted by the corresponding two TPs. Therefore, if a wireless device is to know which resources are allocated for CSI-RS transmission in an interfering transmission, it will need to know both the NZP and ZP CSI-RS configurations. Furthermore, knowledge of the NZP CSI-RS configuration of the interferer does not guarantee that a wireless device will know if the interferer will actually transmit a CSI-RS.

An existing NAICS signaling proposal includes signaling Non-Zero Power (NZP) CSI-RS and Zero Power (ZP) CSI-RS information, and discusses that such signaling can allow a wireless device to find a strongest interfering TP, suggesting that a wireless device could do DMRS detection for a smaller set of IDs, and implying reduced wireless device complexity could result. However, the proposed techniques do not describe specifics of the signaling, including how parameters are signaled together, or details of how CRS and CSI-RS relate to parameters describing interfering PDSCH configurations. Furthermore, the proposal does not provide efficient signaling solutions addressing NZP CSI-RSs that may be blanked by a serving transmission point. Finally, it does not address signaling for improved TP power ranking schemes using a power offset for an NZP CSI-RS, nor how to control when a wireless device may use a CSI-RS for power ranking.

Measurements of CSI-RS for Radio Resource Measurement (RRM) purposes (often called 'CSI-RSRP') have been proposed. However, CSI-RSRP measurements do not indicate what the scheduled PDSCH power may be, since they are used for RRM and are not used for CQI feedback. Furthermore, NZP CSI-RS resources are not associated with a transmission of a particular PDSCH (identified by a DMRS scrambling ID), and so a Rel-11 wireless device can't associate power measurements made on the NZP CSI-RS with the power that could be used when receiving using its DMRS scrambling ID.

Instead of blindly detecting interfering PDSCH precoding matrices and rank, the wireless device may determine this information by decoding the PDCCH of an interfering cell. However, this requires the interfering cell to transmit PDCCHs to its served wireless devices such that NAICS wireless devices in neighbor cells can decode the PDCCHs, which may require extra resources (higher PDCCH aggregation levels or more transmit power). Furthermore, the effort to decode one or multiple neighbor PDCCHs on one or more interfering cell may significantly increase the complexity of a NAICS wireless device and/or the power the wireless device needs in NAICS operation.

SUMMARY

According to some embodiments, systems and methods for identifying interferers in NAICS assistance signaling are provided that reduce the set of interferers whose presence a wireless device must blindly detect and determine which portions of an interferer contain a physical channel.

In one example embodiment, a method for identifying interfering physical channel configurations and cell-specific reference signals (CRSs) for the characterization of dynamic interferers is performed by a first network node. The method includes constructing configuration indications. Each configuration indication includes a physical cell identity, antenna port information for a cell-specific reference signal (CRS), and an identification of a channel state information reference signal (CSI-RS). First and second configuration indications are transmitted to a first wireless device. A first physical channel is transmitted to the first wireless device. A second physical channel that is transmitted from a second network node interferes with the first physical channel and is identifiable at least in part based on the first configuration indication or the second configuration indication. The first configuration indication and the second configuration indication include a same physical cell identity and a same antenna port information.

In another example embodiment, a first network node for identifying interfering physical channel configurations and cell-specific reference signals (CRSs) for the characterization of dynamic interferers includes a memory for storing configuration indication information and at least one processor in communication with the memory. The at least one processor constructs configuration indications. Each configuration indication includes a physical cell identity, antenna port information for a cell-specific reference signal (CRS), and an identification of a channel state information reference signal (CSI-RS). A transceiver transmits, to a first wireless device, first and second configuration indications and a first physical channel to the first wireless device. A second physical channel that is transmitted from a second network node interferes with the first physical channel and is identifiable at least in part based on the first or second configuration indications. The first configuration indication and the second configuration indication include a same physical cell identity and a same antenna port information.

In another example embodiment, a method for identifying interfering physical channel configurations for the characterization of a dynamic interferer is performed by a network node. The method includes transmitting, to a first wireless device, a configuration indication. The configuration indication includes an identification of a channel state information reference signal (CSI-RS) transmitted from a second network node and an assumed power ratio of a first power level to a second power level. The CSI-RS is transmitted on antenna ports other than those that can carry physical channels. The first power level is associated with a second physical channel, and the second power level is associated with the CSI-RS. A first physical channel is transmitted to the first wireless device by the first network node, and the second physical channel is transmitted from the second network node and interferes with the first physical channel.

In another example embodiment, a method for identifying interfering physical channel configurations for the characterization of a dynamic interferer is performed by a network node. The method includes constructing a configuration indication that includes at least one physical resource that does not contain an interfering physical channel and an identification of a channel state information reference signal (CSI-RS) from a second network node. The configuration indication is transmitted to a first wireless device and does not include a CSI-RS sequence identifier. The CSI-RS cannot be transmitted on an antenna port that carries a physical channel from the second network node. The at least one physical resource is identified by at least a number of antenna ports.

In another example embodiment, a first wireless device for identifying interfering physical channel configurations and cell-specific reference signals (CRSs) for the characterization of dynamic interferers includes a memory for storing configuration indication information, a transceiver, and at least one processor. The transceiver receives a first physical channel and configuration indications from a first network node. Each of the configuration indications includes a physical cell identity, antenna port information for a cell-specific reference signal (CRS), and an identification of a channel state information reference signal (CSI-RS). The at least one processor identifies a second physical channel transmitted by a second network node that interferes with the first physical channel. The second physical channel is identified based at least in part on a first configuration indication and a second configuration indication, which include a same physical cell identity and a same antenna port information.

In another example embodiment, a method for identifying interfering physical channel configurations and cell-specific reference signals (CRSs) for the characterization of dynamic interferers is performed by a first wireless device. The method includes receiving, from a first network node, a first physical channel and configuration indications. Each configuration indication includes a physical cell identity, antenna port information for a cell-specific reference signal (CRS), and an identification of a channel state information reference signal (CSI-RS). A second physical channel transmitted by a second network node that interferes with the first physical channel is identified based at least in part on a first configuration indication and a second configuration indication. The first configuration indication and the second indication include a same physical cell identity and a same antenna port information.

Some embodiments of the disclosure may provide one or more technical advantages. For example, in certain embodiments, the systems and methods allow for deployments of NAICS assistance information where any number of transmission points can share a physical cell ID and any number of CCIDs can be associated with a transmission point or cell. Still another advantage may be that wireless devices may rank the power of interfering transmission points transmitting TM9 or TM10 in a more accurate way than relying solely on measurements of a CSI-RS. Additionally, the network may control when the wireless devices use the CSI-RS for ranking purposes. Still another advantage may be that assistance signaling for blanked non-zero power CSI-RS may require less overhead. Additionally, the disclosed systems and methods may allow the wireless device to determine which resource elements of an interferer are not occupied by a PDSCH and, thus, may improve NAICS cancellation efficiency. Still another technical advantage may be providing assistance information for all supported NAICS transmission modes in a unified manner.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
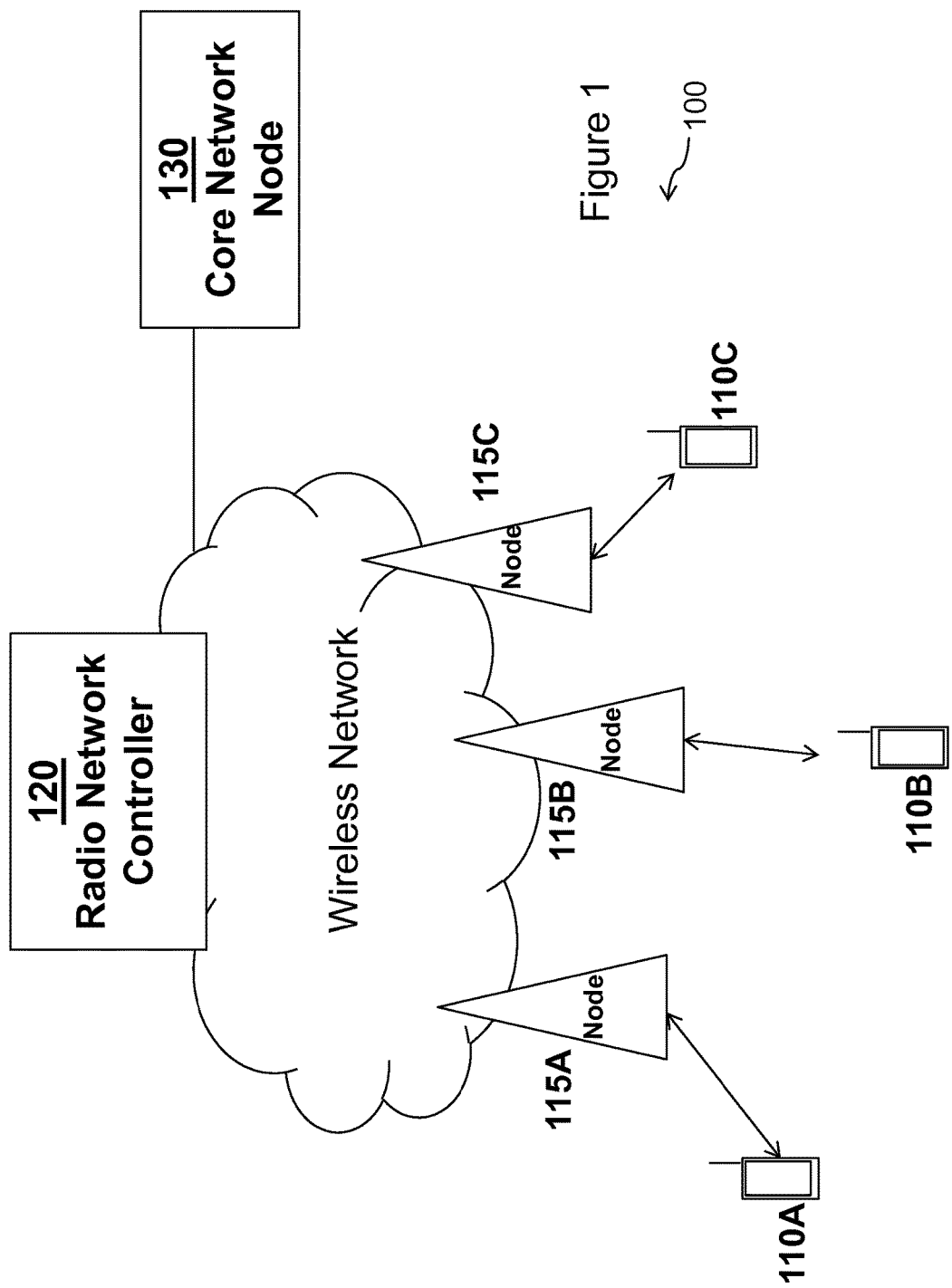
FIG. 1 illustrates an example network, according to certain embodiments.

Systems and methods for identifying interferers in Network Assisted Interference Cancellation and Suppression (NAICS) assistance signaling are provided. The systems and methods provide solutions that help a wireless device to reduce the set of interferers whose presence must be blindly detected. In certain embodiments, the systems and methods may also provide solutions for determining which portions of an interferer contain a physical channel.

In certain particular embodiments, an interferer configuration may be identified at least in part by a physical cell ID, a number of Cell-specific Reference Signal (CRS) ports, and one or more Channel State Information Reference Signal (CSI-RS) configurations. Multiple interferer configurations may be signaled to a NAICS wireless device, wherein the same physical cell ID but different CSI-RSs may be present in two or more configurations. In this manner, wireless devices in a network that uses shared cell IDs may have improved knowledge of which resource elements of the interferer contain Physical Downlink Shared Channel (PDSCH) since it can exclude those occupied by CRS and/or CSI-RS. This may improve the ability of the NAICS-enabled wireless device to suppress or cancel the interfering PDSCH. Measuring the CSI-RSs may also allow the wireless device to determine the set of PDSCH configurations that may interfere, rather than having to blindly detect from all possible interfering PDSCH configurations. Furthermore, since the CRS of the interferer may be identified by the physical cell ID and the number of CRS ports, this information may allow the wireless device to use CRS Interference Cancellation (CRS-IC) without additional signaling.

In a particular embodiment, a Non-zero Power (NZP) CSI-RS may be semi-statically associated with the identified interfering TM9 or TM10 PDSCH. An assumed power ratio of the PDSCH's power of the NZP CSI-RS may also be provided. A NAICS-enabled wireless device may then measure the NZP CSI-RS power and adjust the power measurement to form a rough estimate of what the interfering PDSCH power would tend to be when it is scheduled. This rough power estimate may be used to approximately rank the power of interferers and, thus, avoid blindly detecting interferers that may be too weak to be candidates for interference cancellation or suppression.

In certain other embodiments, resources occupied by an NZP CSI-RS in the interfering transmission may be provided, but the scrambling ID for the NZP CSI-RS may not. This may allow the NAICS-enabled wireless device to know that the interfering PDSCH will not occupy the resources and helps it to determine the rate matching and/or Space Frequency Block Coding (SFBC) pairing of the interfering PDSCH without requiring the (significant) extra overhead of the scrambling ID and/or QCL information needed to receive the NZP CSI-RS.

Additionally, mechanisms to indicate interfering ZP CSI-RS configurations and QCL relationships between interfering PDSCH and reference signals may be provided. Additionally or alternatively, one or more of the above described methods may be combined to include codebook subset restriction.

Particular embodiments are described in FIGS. 1-10 of the drawings, like numerals being used for like and corresponding parts of the various drawings. FIG. 1 is a block diagram illustrating embodiments of a radio network 100 that includes one or more wireless devices 110, radio network nodes 115, radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless devices 110A-C. Wireless device 110 may exchange certain signals with core network node 130 using the non-access stratum layer. In non-access stratum signaling, signals between wireless device 110 and core network node 130 may be transparently passed through the radio access network.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 6, 8, and 10 below, respectively.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long Term Evolution (LTE) technology. However, the scope of the disclosure is not limited to the examples and other embodiments could use different radio access technologies.

In certain embodiments, wireless devices 110 may include NAICS functionality that provides wireless devices 110 with the ability to cancel or suppress both interfering PDSCHs and CRSs. Certain embodiments provided herein provide assistance signaling that supports NAICS functionality on both PDSCH and CRS. In order to provide this signaling, the interfering PDSCH configuration and/or CRS to which the signaling applies may be identified.

In particular embodiments, CRS can be uniquely identified in LTE by a combination of physical cell ID and the number of antenna ports the CRS occupies. If MBSFN subframes are configured, the MBSFN subframe configuration may also be needed to uniquely identify the CRS. Therefore, the physical cell ID, the number of CRS ports, and (if MBSFN subframes are configured on the cell transmitting the CRS) the MBSFN configuration may be provided in the assistance signaling of certain embodiments. Since NAICS Rel-12 functionality should support CRS-IC in any subframe where a NAICS-enabled wireless device 110 has scheduled a physical channel (i.e., PDSCH), this CRS-IC assistance may be provided whenever NAICS assistance may be provided.

In certain embodiments, physical channels (i.e., PDSCHs) may be at least partially identified based on the reference signal used for their channel estimation. For example, Transmission Modes (TMs) 1 through 6 may use CRS for PDSCH channel estimation, and so the physical cell ID and the number of antenna ports of the CRS may be used to help identify TMs 1-6. As other examples, TMs 8, 9, and 10 use a DMRS for channel estimation, where the cell ID may be used to determine the DMRS sequence for TMs 8 and 9, and a wireless device-specific ID (the CCID) may be used for TM10. Where the number of DMRS antenna ports is different from the number of CRS antenna ports, the number of DMRS ports may be determined in order to identify the PDSCH. Rel-12 NAICS uses a blind detection scheme to determine the number of DMRS antenna ports. Thus, in some embodiments, it may not be necessary for NAICS assistance signaling to provide the number of DMRS ports to identify a PDSCH although doing so may benefit wireless device power consumption or improve blind detection performance in cases where the network uses a fixed number of DMRS ports for wireless devices 110A-C.

In certain embodiments, it may be desirable for NAICS-enabled wireless devices 110A-C to have information about the configuration used to transmit an interfering physical channel. Accordingly, it may be beneficial to provide additional assistance information other than that used to determine the CRS or DMRS associated with the PDSCH. Therefore, particular embodiments provide interfering physical channel configuration information in the assistance information. The physical channel configuration information may include parameters such as (but not limited to) one or more of: a maximum number of layers of the PDSCH, a minimum number of contiguous physical resource blocks (PRBs) that a the PDSCH should be scheduled with, a power used to transmit the PDSCH, the TMs that a PDSCH might use, precoding matrices that may be used on the PDSCH, a power offset from a CSI-RS that is used to calculate CSI feedback, a first OFDM symbol in a subframe that the PDSCH can occupy, configurations of (both non-zero power and zero power) CSI-RSs transmitted along with the PDSCH, and quasi co-location relationships (between a DMRS associated with the PDSCH, a CSI-RS, and a CRS).

In a particular embodiment, a given set of physical channel configuration information may be detectable by a NAICS-enabled wireless device 110A-C. It may be desirable for this detection to be as simple as possible. Accordingly, a minimum of measurements of the interferer may be required to identify the configuration. Providing the parameters necessary to receive reference signals associated with the physical channel configuration may be sufficient in many cases since the presence of a reference signal may indicate the presence of a PDSCH and/or allow wireless device 110A-C to calculate statistics on the PDSCH region that can be used to blindly detect the presence of the PDSCH. Then the PDSCH configuration of the detected PDSCH can be associated with the identifiers of the detected reference signal.

When transmission points (TPs) use the same cell ID in shared cell configurations using TM 9, physical channels may be transmitted on one of the TPs. In this case, measurements of the CRS may not indicate which TP the PDSCH is transmitted from. Therefore, DMRS measurements may be used to better identify the PDSCH physical cell configuration associated with the transmitting cell, since multiple scrambling IDs can be transmitted from a cell, and this can differentiate more PDSCH configurations than if the PDSCH configurations are solely associated with a CRS. Furthermore, a distinct CSI-RS may be transmitted from each cell or TP. In this case, wireless device 110 may identify a set of possible interfering PDSCH configurations from the CSI-RSs it measures. An additional benefit is that wireless device 110 may exclude resource elements that contain the CSI-RS from the interfering PDSCH, and so the performance of PDSCH interference cancellation may be improved. Therefore, certain embodiments may provide identification information for CRS, CSI-RS, and/or DMRS as configuration identification information for the physical channel and PDSCH, specifically.

Figure 2:
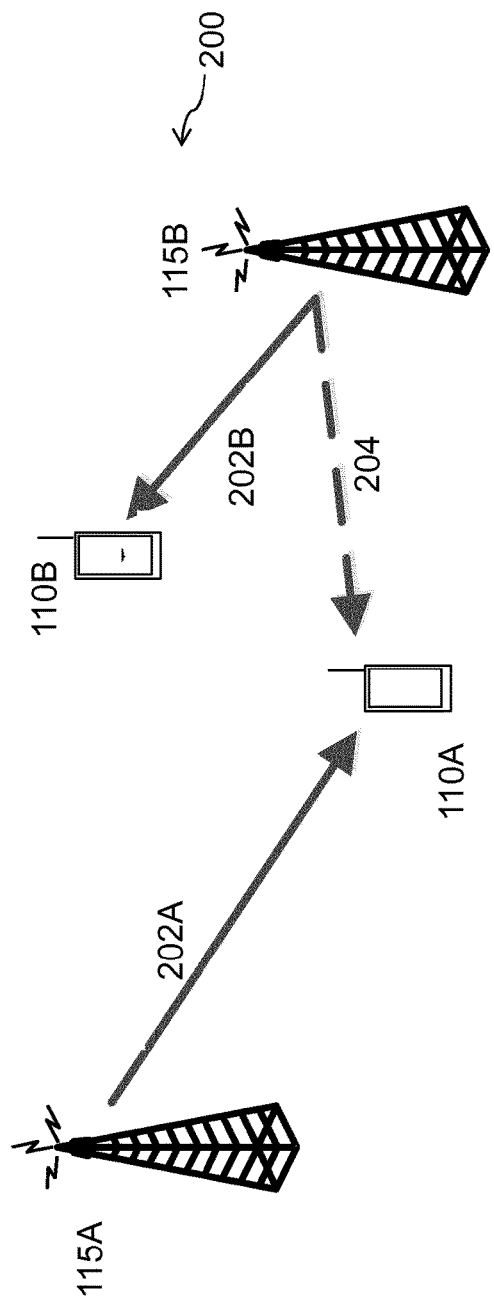
FIG. 2 illustrates an example network in which NAICS assistance is provided in shared cell configurations, according to certain embodiments.

FIG. 2 illustrates an example network 200 in which NAICS assistance may be provided in shared cell configurations. As depicted, a first TP, such as network node 115A, may transmit a first physical channel 202, such as PDSCH, to wireless device 110A. In a particular embodiment, first physical channel 202A may include a cell-specific Reference Signal (CRS) transmitted using a cell ID X and a number of CRS ports N. First physical channel 202 may also include a CSI-RS transmitted with cell ID Y. A second TP, such as network node 115B, may transmit a second physical channel 202B that includes a CRS using cell ID X and a number of CRS ports N. Second physical channel 202B may include a second CSI-RS 208 with ID Z.

As illustrated, first network node 115A is a serving TP for first wireless device 110A, and second network node 115B is a serving TP for second wireless device 110B. Though second physical channel 202B may be intended for second wireless device 110B it may result in an interfering signal 204 being received or detected by first wireless device 110A. Thus, the transmission of first physical channel 202A to first wireless device 110 is indicated with an arrow with a solid line, whereas interfering signal 204 is indicated with an arrow with a dashed line in FIG. 2. NAICS assistance is provided to wireless device 110A that allows first wireless device 110A to identify and determine the configuration of an interfering physical channel 204 that may be transmitted by second network node 115B intended for second wireless device 110B. Where first wireless device is NAICS enabled, a NAICS receiver of first wireless device 110A may then use this information to suppress and/or cancel the interfering signal 204 resulting from the transmission of second physical channel 202B by second network node 115B.

Figure 3:
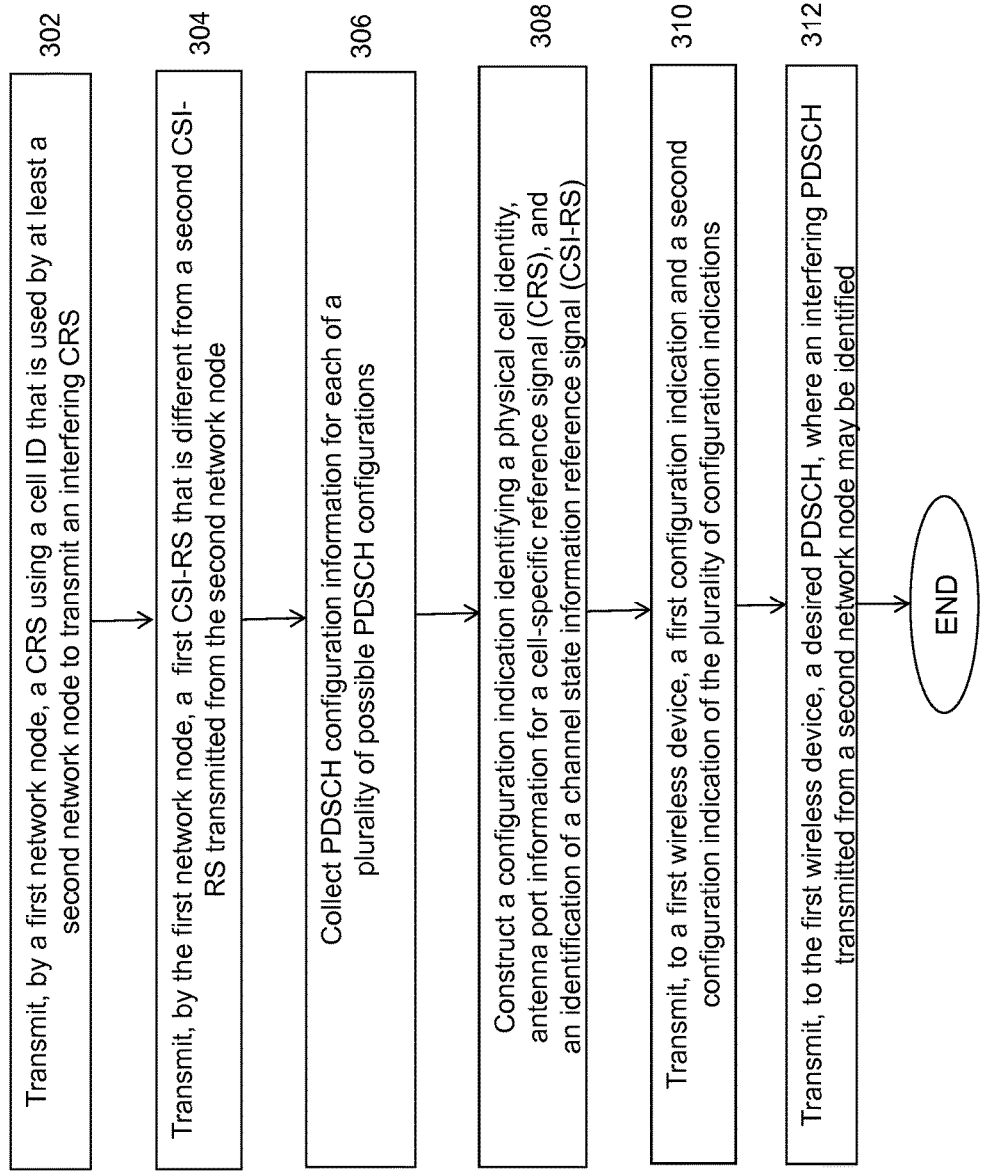
FIG. 3 illustrates an example method for providing configuration indication information for identifying an interfering physical channel as performed by a network node, according to certain embodiments.

FIG. 3 illustrates an example method for 300 providing configuration indication information for identifying an interfering physical channel as performed by a first network node 115A. In a particular example embodiment, method 300 may include identifying a plurality of interfering PDSCH configurations that can be used to transmit an interfering PDSCH from a second network node 115B, where the second network node 115B can use the same cell ID as first network node 115A. The method 300 may also provide identification of a CRS that may be transmitted from second network node 115B.

The method of FIG. 3 begins at step 302 when a first network node 115A transmits a CRS as described above with regard to FIG. 2. For example, the CRS may use a cell ID that is also used by at least a second network node 115B to transmit an interfering CRS. At step 304, first network node 115A also transmits a first CSI-RS as described above with respect to FIG. 2. The first CSI-RS can be used by first wireless node 110A for CSI feedback to first network node 115A. Depending on the particular implementation, first wireless node 110A may also be configured to assume the first CSI-RS is quasi co-located with a DMRS (and a corresponding physical channel such as PDSCH) transmitted from first network node 115A and/or the CRS transmitted from first network node 115A. The first CSI-RS is different from a second CSI-RS that is transmitted from second network node 115B. The second CSI-RS may further be used by wireless device 110A for interferer subset selection, as described in other embodiments herein, or for other purposes as well.

After transmitting the CRS and CSI-RS, network node 115A collects PDSCH configuration information for each of a plurality of PDSCH configurations at step 306. The information may describe how an interfering physical channel may be transmitted from second network node 115B or other interfering network nodes. The PDSCH configuration information may comprise the PDSCH configuration information parameters such as that described above with regard to FIG. 2.

At step 308, first network node 115A constructs a configuration indication. The configuration indication may include PDSCH configuration identification information gathered at step 306. The configuration indication may enable first wireless device 110A to determine the PDSCH configurations that may be transmitted by an interfering second network node 115B. In a particular embodiment, the PDSCH configuration indication includes at least a physical cell ID and the number of CRS antenna ports for a cell specific-CRS. The configuration indication may also include identifications of NZP CSI-RSs or DMRSs as well as other parameters, in particular embodiments. For shared cell operation, identifying at least the first CSI-RS (along with the CRS) is beneficial to differentiate PDSCH configurations that may be transmitted from first network node 115A and second network node 115B.

At step 310, first network node 115A transmits at least a first configuration indication and a second configuration indication to a wireless device 110. In certain embodiments, first network node 115A may indicate the PDSCH configuration information and the corresponding PDSCH identification information in NAICS assistance signaling that is transmitted to first wireless device 110A. In a particular embodiment, this can be accomplished using RRC signaling.

After first wireless device 110A has received the needed NAICS assistance signaling, first network node 115A may transmit a first physical channel 202A to first wireless device 110A at step 312. Second network node 115B may also transmit a second physical channel 202B to second wireless device 110B. As will be described in more detail with regard to FIG. 4, the configuration of the second physical channel 202B to second wireless device 110B can be identified by first wireless device 110A using the configuration indications provided to first wireless device 110A by first network node 115A.

Figure 4:
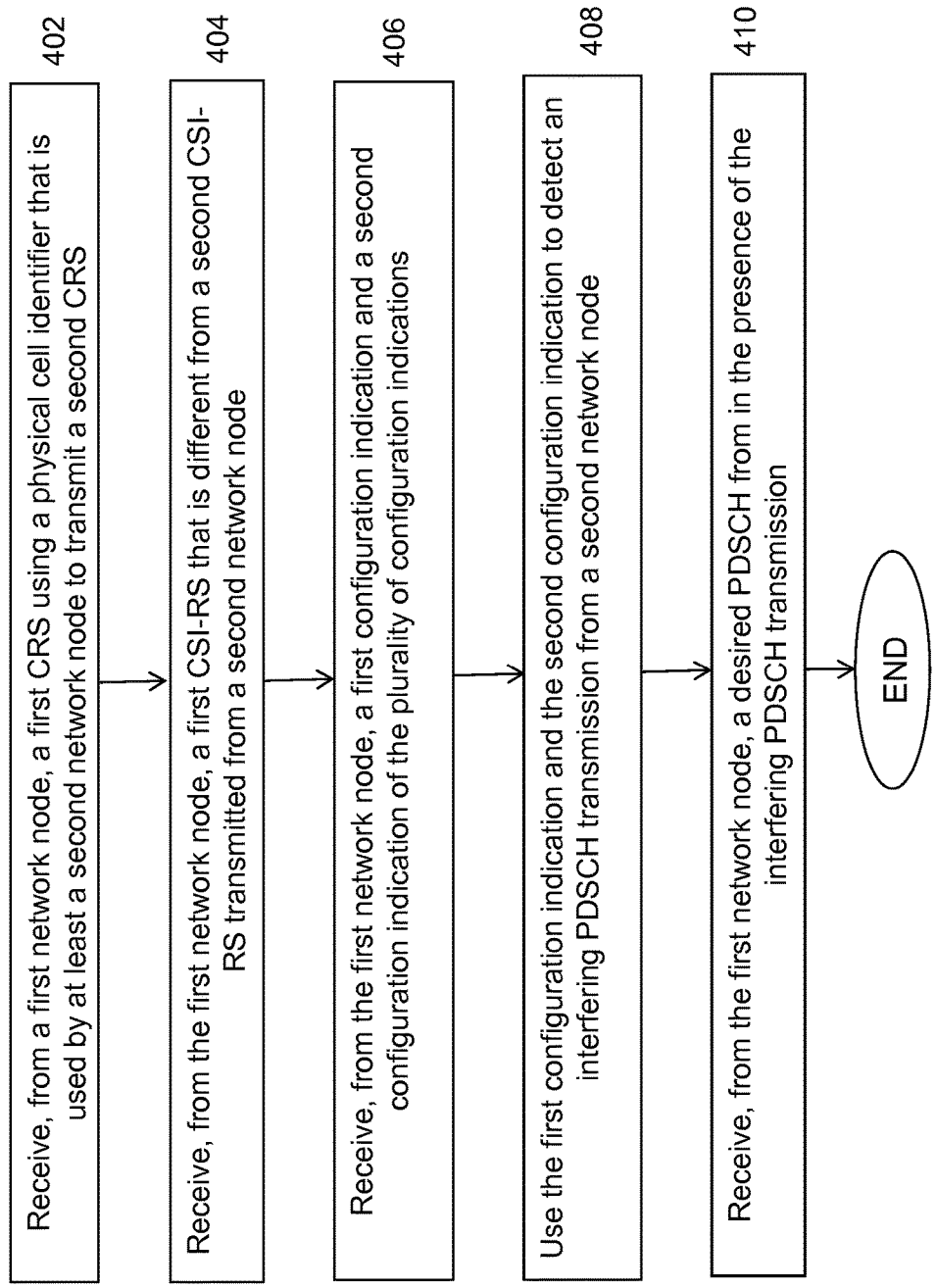
FIG. 4 illustrates an example method for receiving configuration indication information and identifying an interfering physical channel as performed by a wireless device, according to certain embodiments.

FIG. 4 illustrates an example method (400) for receiving configuration indication information and identifying an interfering physical channel as performed by a wireless device (110A). The method begins at step 402 when first wireless device 110A receives a first CRS from first network node 115A. The cell ID may be used by at least first network node 115A and second network node 115B to transmit their CRSs.

At step 404, wireless device 110A receives the first CSI-RS from first network node 115A. The first CSI-RS is different from a second CSI-RS transmitted from second network node 115B. At step 406, wireless device 110A receives NAICS assistance signaling including at least a first configuration indication and second configuration indication from network node 115B. In a particular embodiment, the first and second configuration indications include the PDSCH configuration and PDSCH configuration identification information from radio network node 115A.

At step 408, wireless device 110A uses the first configuration indication and the second configuration indication to detect an interfering physical channel transmission from second network node 115B. For example, wireless device 110A may use the measurements of the CRS and the second CSI-RS to detect an interfering physical channel 204 having the PDSCH configuration provided in the assistance signaling. Having detected the interfering physical channel 204, first wireless device 110A may use its NAICS capability to suppress or cancel interfering physical channel 204 from the desired physical channel 202A from first network node 115A.

A first exemplary RRC signaling embodiment is shown below:

```
NAICS-AssistanceInfo-r12 ::= SEQUENCE {
    naics-ConfigID-r12      Naics-ConfigID-r12,
    minPRBs-r12             INTEGER (1..dl-Bandwidth)      DEFAULT 1,
    naics-supportedTMs-r12  BIT STRING (SIZE (7))          OPTIONAL, -- Need ON
    physCellId-r12          PhysCellId,
    crsPortsCount-r12       ENUMERATED {an1, an2, an4, spare1},
    mbsfn-ConfList-r12      MBSFN-SubframeConfigList       OPTIONAL, -- Need ON
    naics-CSIRS-Info-r12 {
        p-C-r12                 INTEGER (-8..15),              OPTIONAL, -- Need ON
        csi-RS-NZP-r12          NAICS-CSIRS-Config-r12
    }                                                          OPTIONAL, -- Need ON
    ...
}
NAICS-CSIRS-Config-r12 ::= SEQUENCE {
    antennaPortsCount-r11   ENUMERATED {an1, an2, an4, an8},
    resourceConfig-r11      INTEGER (0..31),
    subframeConfig-r11      INTEGER (0..154),
    scramblingIdentity-r11  INTEGER (0..503)
}
Naics-ConfigID-r12 ::=      INTEGER (1..maxNaicsConfig-r12)
maxNaicsConfig-r12          INTEGER ::= 6  -- Maximum number of interferers with assistance
                                              information
```

Example 1: RRC Signaling

The terms of the first example RRC signaling provided immediately above may be defined or described as follows:

NAICS-AssistanceInfo field descriptions neighCellsNAICS-Info
This field contains assistance information, used by the UE to mitigate interference from PDSCH while performing data demodulation.
minPRBs
A UE may assume that the interfering PDSCH should be scheduled with minimum of minPRBs contiguous PRB pairs. The value of dl-Bandwidth corresponds to the UE's serving cell.
naics-SupportedTMs
A bitmap indicating the subset of transmission modes for which the interfering PDSCH may be configured. Starting from the first/leftmost bit in the bitmap, the bits correspond to transmission modes 1, 2, 3, 4, 6, 8, and 9, respectively. The transmission modes are defined in TS 36.213 [23, 7.1].
physCellId
The physical cell ID associated with an interfering CRS and/or an interfering PDSCH.
crsPortsCount
The number of CRS ports that the UE can assume should be present on a cell transmitting the interfering PDSCH.
mbsfn-ConfList
The subframes the UE can assume should be configured for MBSFN transmission on a cell transmitting the interfering PDSCH.
naics-CSIRS-Info
Identifies CSI-RS parameters a UE can assume should be used for an interfering PDSCH
p-C
The value of parameter $P_c$ that a wireless device can assume should be used for the interfering transmission mode 9 or 10 PDSCH associated with the CSI-RS identified by csi-RS-NZP, see TS 36.213 [23, 7.2.5].
csi-RS-NZP
Identifies a CSI-RS the UE can assume should be transmitted by the interferer if it is configured to receive transmission mode 9 or 10.

| NAICS-CSIRS-Config field descriptions |
| --- |
| antennaPortsCount<br>Parameter represents the number of antenna ports used for transmission of the CSI reference signal where value an1 corresponds to 1 antenna port, an2 to 2 antenna ports and so on, See TS 36.211 [21, 6.10.5].<br>resourceConfig<br>Parameter: CSI reference signal configuration, see TS 36.211 [21, table 6.10.5.2-1 and 6.10.5.2-2].<br>subframeConfig<br>Parameter: $I_{CSI\text{-}RS}$, see TS 36.211 [21, table 6.10.5.3-1].<br>scramblingIdentity<br>Parameter: Pseudo-random sequence generator parameter, $n_{ID}$, see TS 36.213 [23, 7.2.5]. |

For purposes of the provided example, Information Elements (IEs) and references not defined here may be the same as those used in Rel-11 (3GPP Technical Specification 36.331 v. 12.1.0, "Radio Resource Control (RRC); Protocol specification (Release 12)" March 2014). While RRC signaling may be used in order to compactly transmit the configuration indications, an alternative embodiment may be equivalently be implemented using a mixture of physical and higher layer specifications. Additionally, NAICS-AssistanceInfo may be extended to contain other IEs used to assist NAICS reception.

In the above-provided example, the interfering configuration indication and the desired configuration indication information are provided in a combined manner. For example, each NAICS-AssistanceInfo-r12 IE may correspond to one configuration indication, and multiple configuration indications may be provided to each wireless device 110A-C. Since multiple configuration indications may be provided, each configuration indication may be identified with an index (i.e., NAICS-ConfigID-r12), in particular embodiments. Doing so may allow the parameters in a given configuration to be changed without reconfiguring all the assistance information. As a result, the amount of signaling overhead required may be reduced. In a particular embodiment, the physical cell ID (i.e., physCellId-r12) may not be used to index the configuration indications, since doing so would prevent different configuration indications from being used between network nodes 115A-B with the same cell ID.

In the signaling example above, the PDSCH configuration identification information corresponding to the CRS is provided by the physCellId-r12, crsPortsCount-r12, and mbsfn-ConfList-r12 IEs, while the identification information corresponding to the CSI-RS is given by csi-RS-NZP-r12. The PDSCH configuration information may be given in min-PRBs-r12, and naics-supportedTMs-r12, and p-C-r12. The minPRBs-r12 IE indicates the minimum number of PRB pairs that a wireless device 110A can expect the physical channel should be scheduled with, while naics-supportedTMs-r12 indicates the transmission modes the wireless device 110A should expect to be used for the physical channel. The p-C-r12 IE indicates the value of parameter $P_c$ that a wireless device 110A may assume should be used for the interfering physical channel if it is TM 9 or 10. The use of this IE will be described in more detail in the example embodiments provided below.

In certain embodiments, a NZP CSI-RS may be used for PDSCH power ranking purposes. Referring back to FIG. 2, each network node 115A may transmit a non-zero power CSI-RS that may be used for CSI feedback, according to LTE Rel-11 operation. A wireless device 110A may use CSI-RS with ID=Y for feedback for first network node 115A, and CSI-RS with ID=Z may be used for feedback from second network node 115B. In such an embodiment, wireless devices 110A-C calculate the CSI feedback using an assumed ratio of PDSCH EPRE to CSI-RS EPRE ('$P_c$'), as described in 3GPP Technical Specification 36.213, v. 12.1.0, "Physical layer procedures (Release 12)", March 2014.

In certain embodiments, and in order to limit blind detection complexity, first wireless device 110A pre-determines a set of NAICS candidate interferers as a subset of the interferers wireless device 110A has NAICS assistance for, and only blindly detects the presence of the interferers in this NAICS candidate set. In order to do this, first wireless device 110A may determine an approximate power that an interfering physical channel would have if it were transmitted.

Figure 5:
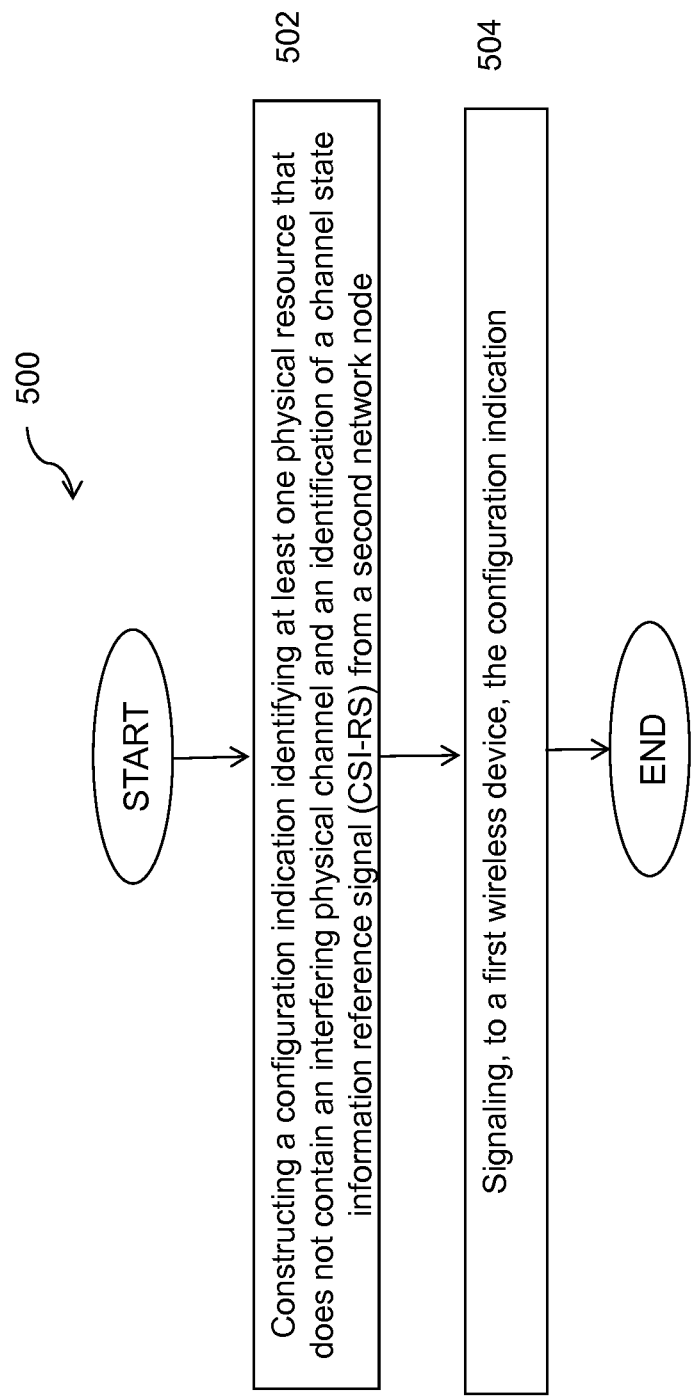
FIG. 5 illustrates another example method for providing configuration indication information for the characterization of a dynamic interferer, according to certain embodiments.

FIG. 5 illustrates an example method for providing configuration indication information for for the characterization of a dynamic interferer using power estimation. The method begins at step 502 with the construction of one or more configuration indications. In particular embodiments for PDSCH Transmission Modes (TMs) 1 to 6, the configuration indication identifies at least one physical resource that does not contain an interfering physical channel. The configuration indication may also identify a CSI-RS from second network node 115B. The configuration indication is signaled to first wireless device 110A at step 504. Furthermore, a wireless device 110A-C may be aware of parameters that may be used to transmit an interfering PDSCH such as '$P_A$', as described in 3GPP Technical Specification 36.213, v. 12.1.0, "Physical layer procedures (Release 12)", March 2014, that indicate the PDSCH EPRE to CRS EPRE power ratio of the interfering PDSCH for TMs 1 to 6. In this case, thereafter, a wireless device 110 may measure CRS and apply the power offset $P_A$ to form an approximate estimate of the interfering PDSCH power.

In still other embodiments implementing TMs 8, 9, and 10, first wireless device 110A in Rel-11 may use the DMRS to determine the PDSCH power. Thus, CRS measurements may not be well suited for interfering PDSCH power estimation. Using CRS for PDSCH power estimation may be particularly problematic in shared cell setups such as in FIG. 2, since the PDSCH may be transmitted from first network node 115A, while the CRS are transmitted from both first network node 115A and second network node 115B.

Such embodiments enable NAICS candidate interferer selection by identifying a non-zero power CSI-RS transmitted from each network node 115A-C in assistance information, and associating the identified NZP CSI-RS with an interfering PDSCH configuration. More specifically, first network node 115A provides an identifier for the CSI-RS transmitted on second network node 115B (the CSI-RS with ID=Z in FIG. 2) as part of the PDSCH configuration indication in the method 300 of FIG. 3. Then wireless device 110A can measure the NZP CSI-RS transmitted on second network node 115E in order to get a rough estimate of what power the interfering physical channel 202B would have when interfering physical channel 202B was transmitted.

In certain embodiments, first wireless device 110A may form a better interfering PDSCH power estimate if first wireless device 110A knows roughly what power second network node 115B will transmit the physical channel 202B with. Because $P_c$ is used for CSI feedback, it may be indicative of the PDSCH transmit power that second network node 115B will use. Since in Rel-11, $P_c$ varies from −8 to 15 dB, using $P_c$ may provide a significantly better estimate of the PDSCH power than using CSI-RS measurements without compensating with $P_c$. Therefore, certain embodiments provide both CSI-RS identifiers and $P_c$ in the assistance information. These embodiments are included in the general embodiment described using the NAICS-AssistanceInfo IE of example one above.

Because $P_c$ is configured per wireless device 110A-C in Rel-11, a CSI-RS transmitted from a network node 115A-C may be associated with multiple values of $P_c$. In this case, if only one $P_c$ is associated with a PDSCH configuration in the assistance signaling, as is the case in the embodiment described below, it is necessary to determine the value of $P_c$ for use in the assistance signaling from the multiple values of $P_c$ associated with the CSI-RS. In one approach, the largest value of $P_c$ is used in the assistance signaling, as this is indicative of the worst case interference that the network node 115A-C would cause. Other approaches such as signaling an average of the $P_c$ values, are also possible, and may be used according to network implementation and radio conditions.

In an alternative embodiment, multiple values of $P_c$ may be associated with a PDSCH configuration in the assistance signaling. This alternative embodiment is the same as the general embodiment shown above, except that multiple values of p-C-r12 are provided in NAICS-AssistanceInfo-r12. Providing two values of p-C-r12 may be suitable in cases where one value of $P_c$ is used for each of two CSI subframe sets.

In still other embodiments, it may not be always desirable for wireless devices 110A-C to use CSI-RS measurements to determine NAICS candidate interferers. Therefore, $P_c$ may be made an optional parameter within the assistance signaling. If it is not provided, the network can expect that wireless device 110A-C may not use CSI-RS measurements for NAICS candidate selection.

In certain other embodiments, multiple NZP CSI-RSs are associated with an interfering PDSCH configuration. In this case, wireless devices 110A-C using interferer candidate selection may determine which CSI-RS to use for interferer power estimation. Therefore, the NZP CSI-RS to be used may be selected with a specified rule.

A second exemplary RRC signaling embodiment is shown below:

Example 2: RRC Signaling

The terms of the second example RRC signaling provided immediately above may be defined or described in Rel-11 and as follows:

| NAICS-Assistanceinfo field descriptions |
|---|
| naics-CSIRS-info |
| Identifies CSI-RS parameters a UE can assume should be used for an interfering PDSCH |
| p-C |
| The value of parameter $P_c$ that a wireless device can assume should be used for the interfering transmission mode 9 or 10 PDSCH associated with the first CSI-RS identified in csi-RS-NZP-List, see TS 36.213 [23, 7.2.5]. |
| csi-RS-NZP-List |
| Identifies one or more CSI-RSs associated with the interferer if it is configured to receive transmission mode 9 or 10. |

While RRC signaling may be used to provide NAICS assistance information, other embodiments may be implemented using a mixture of physical and higher layer specifications. Also, NAICS assistance information may be extended to contain other IEs used to assist NAICS reception.

The signaling of example 2 is similar to that of example 1 except that the csi-RS-NZP-r12 IE is replaced by the csi-RS-NZP-List-r12 IE, and the csi-RS-NZP-List-r12 identifies a list of maxCSI-RS-NZP-r11 NZP CSI-RSs. Note that the NAICS-AssistanceInfo field descriptions not given here are the same as in the general embodiment described above. In this alternative embodiment, the rule is that the first NZP CSI-RS listed in csi-RS-NZP-List-r12 is associated with $P_c$, and so the first listed NZP CSI-RS may be used for NAICS candidate interferer determination in the first wireless device 110A.

As discussed above, if first wireless device 110A is to know which resources are allocated for CSI-RS transmission, first wireless device 110A will need to know both NZP and ZP CSI-RS configurations of the interferer. NAICS assistance signaling mechanisms are therefore provided herein for both NZP and ZP CSI-RS configurations.

```
NAICS-AssistanceInfo-r12 ::=  SEQUENCE {
    naics-ConfigID-r12      Naics-ConfigID-r12,
    minPRBs-r12             INTEGER (1..dl-Bandwidth)     DEFAULT 1,
    naics-supportedTMs-r12  BIT STRING (SIZE (7))         OPTIONAL, -- Need ON
    physCellId-r12          PhysCellId,
    crsPortsCount-r12       ENUMERATED (an1, an2, an4, spare1),
    mbsfn-ConfList-r12      MBSFN-SubframeConfigList      OPTIONAL, -- Need ON
    naics-CSIRS-Info-r12 {
        p-C-r12                 INTEGER (-8..15),             OPTIONAL, -- Need ON
        csi-RS-NZP-List-r12 SEQUENCE (SIZE (1..maxCSI-RS-NZP-r11)) of NAICS-CSIRS-Config-r12
                                                          OPTIONAL, -- Need ON
    }                                                     OPTIONAL, -- Need ON
    ...
}
NAICS-CSIRS-Config-r12 ::=  SEQUENCE {
    antennaPortsCount-r11   ENUMERATED {an1, an2, an4, an8},
    resourceConfig-r11      INTEGER (0..31),
    subframeConfig-r11      INTEGER (0..154),
    scramblingIdentity-r11  INTEGER (0..503)
}
Naics-ConfigID-r12 ::=       INTEGER (1..maxNaicsConfig-r12)
maxNaicsConfig-r12           INTEGER ::= 6     -- Maximum number of interferers with assistance
information
maxCSI-RS-NZP-r11            INTEGER ::= 3     -- Maximum number of CSI RS resource
                                               -- configurations using non-zero Tx power
                                               -- (per carrier frequency)
```

While the Rel-11 IE CSI-RS-ConfigZP-r11 could be used to indicate ZP CSI-RS in assistance signaling for TM10 PDSCHs, Rel-11 contains csi-RS-ConfigZPId-r11, which is not relevant to a NAICS-enabled wireless device 110. Therefore, the embodiment uses an IE, NAICS-CSIRS-ConfigZP-r12, which is a modified version of CSI-RS-ConfigZP-r11 that omits csi-RS-ConfigZPId-r11. Note that while a Rel-11 wireless device may be configured with multiple zero power CSI-RS configurations, since all possible zero power CSI-RS resources can be indicated using one NAICS-CSIRS-ConfigZP-r12 IE, it may only be necessary to provide one NAICS-CSIRS-ConfigZP-r12 IE per interfering network node 115A-C.

Since a given interfering network node 115A-C will tend to transmit its NZP CSI-RS and not transmit in resources carrying NZP CSI-RSs corresponding to other network nodes 115A-C, a NAICS-enabled wireless device 110A-C may only need to receive the CSI-RS transmitted from the interfering network node 115A-C. Furthermore, since the interfering network node 115A-C does not transmit PDSCH in resource elements corresponding to other network nodes 115A-C, NAICS assistance signaling of the 'empty' NZP CSI-RS that the interfering network node 114A-C does not transmit on may help wireless device 110A-C to better determine the RE mapping of the interfering physical channel 204, including which REs are paired for transmit diversity (SFBC).

The Rel-11 IE CSI-RS-ConfigNZP contains the needed information for NAICS assistance signaling since it completely describes an NZP CSI-RS. Consequently, the Rel-11 IE CSI-RS-ConfigNZP may be used for NAICS assistance signaling. However, CSI-RS-ConfigNZP also contains csi-RS-ConfigNZPId-r11, which is not relevant to NAICS operation. Also, if PDSCH configuration identification information identifies a CRS, this CRS may be used for quasi co-location, which may render the IE qcl-CRS-Info-r11 in CSI-RS-ConfigNZP redundant. Therefore, certain embodiments may preferably use the NAICS-CSIRS-Config-r12 to identify the CSI-RS transmitted by the interferer. This IE contains only the information needed to identify the NZP CSI-RS: the number of antenna ports of the CSI-RS, resource and subframe configurations, as well as scrambling identity.

Since only parameters related to RE mapping are needed for the 'empty' NZP CSI-RSs, the parameters may be signaled in a similar way to that used for zero power CSI-RS, in certain embodiments. However, NZP CSI-RS resources are partly determined by the number of antenna ports, and so the resources occupied by zero power CSI-RSs may not be equivalent to two antenna port NZP resources. Therefore, ZP CSI-RS resource signaling should not be reused to indicate NZP resources, in certain embodiments.

In certain embodiments, there may be two options to signal the 'empty' NZP resources. The first option may include reusing the existing signaling or modifying the existing signaling to only indicate the resources occupied by the NZP CSI-RS. If the signaling is modified as proposed below in the NAICS-CSIRS-NZP-Res-r12 IE, approximately 15 bits may be needed. On the other hand, if the Rel-11 IE CSI-RS-ConfigNZP is reused, the CSI-RS scrambling ID would be included. Since the CSI-RS scrambling ID requires 9 bits, the overhead is increased to 24 bits. Stated differently, the CSI-RS scrambling ID increases the overhead by a factor of 1.6, in certain embodiments. Since being able to coherently receive CSI-RSs not transmitted from the interfering network node 115E is not likely to improve NAICS performance, designs with the extra overhead from the CSI-RS scrambling ID may not be preferred. Also, for the same reasons above for CSI-RS transmitted by the interferer, csi-RS-ConfigNZPId-r11 and qcl-CRS-Info-r11 may not be beneficial to signal for the 'empty' NZP CSI-RSs. Therefore, the embodiment herein uses NAICS-CSIRS-NZP-Res-r12 to identify each empty CSI-RS. The only difference between this IE and the NAICS-CSIRS-Config-r12 is that this IE describes the REs and subframes occupied by the CSI-RS, and does not provide the NZP CSI-RS scrambling ID.

It may further be desirable to indicate the quasi co-location behaviour a NAICS-enabled wireless device 110 may assume should be used for an interfering TM10 physical channel. In this case, the PDSCH configuration indication may include the DMRS scrambling IDs that may be associated with the PDSCH configuration. Additionally, the configuration indication may include whether QCL Type A or QCL Type B behavior may be assumed. According to Example 3 provided below, the naics-TM10Info-r12 IE containing the DMRS scrambling IDs and the QCL type assumptions. The CRS associated with the QCL relationship is identified by physCellId-r12, crsPortsCount-r12, and (if MBSFN subframes are configured for the cell), mbsfn-ConfList-r12. The CSI-RS associated with the QCL relationship is identified by csi-RS-NZP-r12

In this embodiment, the qcl-Operation-r12 is an optional parameter. If qcl-Operation-r12 is not signaled, then first wireless device 110A has no indication if Type A or Type B QCL can be assumed. Accordingly, wireless device 110A and may use channel estimation based on the information it has. Since first wireless device 110A knows the DMRS scrambling ID, first wireless device 110A may receive the interferer's DMRS and is still able to estimate the interferer's channel. However, first wireless device 110A must additionally use the DMRS for frequency estimation and large scale channel estimation (e.g. delay spread and average delay), whereas CSI-RS and CRS may be used for these purposes if QCL information is available.

A third exemplary RRC signaling embodiment is shown below:

```
NAICS-AssistanceInfo-r12 ::= SEQUENCE {
    naics-ConfigID-r12      Naics-ConfigID-r12,
    physCellId-r12          PhysCellId,
    crsPortsCount-r12       ENUMERATED {an1, an2, an4, spare1},
    mbsfn-ConfList-r12      MBSFN-SubframeConfigList        OPTIONAL, -- Need ON
    naics-CSIRS-Info-r12 {
        p-C-r12             INTEGER (-8..15),               OPTIONAL, -- Need ON
        csi-RS-NZP-r12      NAICS-CSIRS-Config-r12          OPTIONAL, -- Cond naicsQCL
        nzp-Re-List-r12     SEQUENCE (SIZE (1..maxCSIRS-NZP-Res-r12)) of NAICS-CSIRS-NZP-
Res-r12
                                                            OPTIONAL, -- Need ON
        csi-RS-ZP-r12       NAICS-CSIRS-ConfigZP-r12        OPTIONAL, -- Need ON
    }                                                       OPTIONAL, -- Cond naicsQCL
```

-continued

```
        naics-TM10Info-r12 {
            scramblingId1-r12      INTEGER (0..503),
            scramblingId2-r12      INTEGER (0..503),
            qcl-Operation-r12      ENUMERATED {typeA, typeB}       OPTIONAL, -- Need ON
        }                                                          OPTIONAL, -- Need ON
        ...
    }
NAICS-CSIRS-Config-r12 ::= SEQUENCE {
    antennaPortsCount-r11   ENUMERATED {an1, an2, an4, an8},
    resourceConfig-r11      INTEGER (0..31),
    subframeConfig-r11      INTEGER (0..154),
    scramblingIdentity-r11  INTEGER (0..503)
}
NAICS-CSIRS-NZP-Res-r12 ::= SEQUENCE {
    antennaPortsCount-r12   ENUMERATED {an1, an2, an4, an8},
    resourceConfig-r12      INTEGER (0..31),
    subframeConfig-r12      INTEGER (0..154)
}
NAICS-CSIRS-ConfigZP-r12 ::= SEQUENCE {
    resourceConfigList-r11  BIT STRING (SIZE (16)),
    subframeConfig-r11      INTEGER (0..154)
}
maxNaicsConfig-r12          INTEGER ::= 6   -- Maximum number of interferers with assistance
information
maxCSIRS-NZP-Res-r12        INTEGER ::= 2   -- Maximum number of additional NZP CSI-RS
resource
                                            configurations per interfering TM10 PDSCH
```

Example 3: RRC Signaling

The terms of the third example RRC signaling example provided immediately above may be defined or described in Rel-11 and as follows:

NAICS-AssistanceInfo field descriptions neighCellsNAICS-Info
This field contains assistance information, used by the UE to mitigate interference from PDSCH while performing data demodulation. The assistance information is associated with particular PDSCHs generated using scramblingId1, scramblingId2, or physCellId.
physCellId
The physical cell ID associated with an interfering CRS and/or an interfering PDSCH.
crsPortsCount
The number of CRS ports that the UE can assume should be present on a cell transmitting the interfering PDSCH.
mbsfn-ConfList
The subframes the UE can assume should be configured for MBSFN transmission on a cell transmitting the interfering PDSCH.
naics-CSIRS-Info
Identifies CSI-RS parameters a UE can assume should be used for an interfering PDSCH.
p-C
The value of parameter $P_c$ that a wireless device can assume should be used for the interfering transmission mode 9 or 10 PDSCH associated with the CSI-RS identified by CSI-RS-NZP, see TS 36.213 [23, 7.2.5].
csi-RS-NZP
Identifies a CSI-RS the UE can assume should be transmitted by the interferer if it is configured to receive transmission mode 9 or 10.
nzp-Re-List
Identifies REs of the interferer that the UE can assume should not be occupied by the interfering PDSCH and may contain a CSI-RS.
csi-RS-ZP
Identifies REs of the interferer that the UE can assume should be occupied by zero power CSI-RS.
naics-TM10Info
Identifies an interfering TM10 PDSCH.
scramblingId1, scramblingId2
Parameter: $n_{ID}^{DMRS}$, used to transmit an interfering PDSCH with transmission mode 10, see TS 36.211 section 6.10.3.1.
qcl-Operation
Indicates the quasi co-location behaviour that a UE can assume is used for the interfering transmission mode 10 PDSCH, type A and type B, as described in TS 36.213 [23, 7.1.10], with the CRS identified by physCellId and/or the CSI-RS identified by CSI-RS-NZP.
maxNaicsConfig
Maximum number of interferers for which NAICS assistance information is provided.

-continued

NAICS-AssistanceInfo field descriptions maxCSIRS-NZP-Res
Maximum number of CSI-RS configurations that can be used to indicate which REs of an interferer should not contain PDSCH.
maxNAICS-PA
Maximum number of values of naics-p-a that the UE can assume should be used.

| Conditional presence | Explanation |
|---|---|
| naicsQCL | The field is mandatory present if the field qcl-Operation is present, otherwise the field is optionally present, need ON |

NAICS-CSIRS-Config field descriptions antennaPortsCount
Parameter represents the number of antenna ports used for transmission of the CSI reference signal where value an1 corresponds to 1 antenna port, an2 to 2 antenna ports and so on, See TS 36.211 [21, 6.10.5].
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
scramblingIdentity
Parameter: Pseudo-random sequence generator parameter, $n_{ID}$, see TS 36.213 [23, 7.2.5].

NAICS-CSIRS-NZP-Res field descriptions antennaPortsCount
Parameter represents the number of antenna ports used for transmission of the CSI reference signal where value an1 corresponds to 1 antenna port, an2 to 2 antenna ports and so on, See TS 36.211 [21, 6.10.5].

NAICS-CSIRS-NZP-Res field descriptions resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].

NAICS-CSIRS-ConfigZP field descriptions resourceConfigList
Parameter: ZeroPowerCSI-RS, see TS 36.213 [23, 7.2.7].
subframeConfig
Parameter: $I_{CSI-RS}$, see TS 36.211 [21, table 6.10.5.3-1].

Again, while RRC signaling may be used to provide NAICS assistance information, other embodiments may use a mixture of physical and higher layer specifications. Also, NAICS assistance information can be extended to contain other IEs used to assist NAICS reception.

In still other embodiments, the above-described mechanisms may be combined and used in combination with a codebook subset restriction using RRC signaling as shown in Example 4 below:

```
NeighCellsNAICS-Info-r12 ::=         CHOICE {
      naics-AssistanceInfoToReleaseList-r12    NAICS-AssistanceInfoToReleaseList-r12        OPTIONAL,
-- Need ON
      naics-AssistanceInfoToAddModList-r12   NAICS-AssistanceInfoToAddModList-r12         OPTIONAL,
-- Need ON
}
NAICS-AssistanceInfoToReleaseList-r12 ::= SEQUENCE (SIZE (1..maxNaicsConfig-r12)) OF NAICS-
AssistanceInfo-r12
NAICS-AssistanceInfoToAddModList-r12 ::= SEQUENCE (SIZE (1..maxNaicsConfig-r12)) OF NAICS-
AssistanceInfo-r12
NAICS-AssistanceInfo-r12 ::= SEQUENCE {
      naics-ConfigID-r12         Naics-ConfigID-r12,
      nLayer-r12                 ENUMERATED {layer1, layer2}         DEFAULT layer2,
      minPRBs-r12                INTEGER (1..dl-Bandwidth)           DEFAULT 1,
      naics-supportedTMs-r12     BIT STRING (SIZE (7))               OPTIONAL, -- Need ON
      pdsch-start-r12            INTEGER (1..4)                      OPTIONAL, -- Need ON
      physCellId-r12             PhysCellId,
      crsPortsCount-r12          ENUMERATED {an1, an2, an4, spare1},
      mbsfn-ConfList-r12         MBSFN-SubframeConfigList            OPTIONAL, -- Need ON
      naics-TM1to6Info-r12       SEQUENCE {
          naics-p-a-List              SEQUENCE (SIZE (1..maxNAICS-PA-r12)) of NAICS-p-a
                                                                     OPTIONAL, -- Need ON
          naics-p-b                   INTEGER (0..3),                OPTIONAL, -- Need ON
          pmiList-TM46-r12            BIT STRING (SIZE (32))         OPTIONAL, -- Need ON
          pmi-TM3-r12                 BIT STRING (SIZE (4))          OPTIONAL, -- Need ON
      }                                                              OPTIONAL, -- Need ON
      naics-CSIRS-Info-r12 {
          p-C-r12                     INTEGER (-8..15),              OPTIONAL, -- Need ON
          csi-RS-NZP-r12              NAICS-CSIRS-Config-r12         OPTIONAL, -- Cond naicsQCL
```

```
        nzp-Re-List-r12           SEQUENCE (SIZE (1..maxCSIRS-NZP-Res-r12)) of NAICS-CSIRS-NZP-
Res-r12
                                                                OPTIONAL, -- Need ON
        csi-RS-ZP-r12             NAICS-CSIRS-ConfigZP-r12      OPTIONAL, -- Need ON
    }                                                           OPTIONAL, -- Cond naicsQCL
    naics-TM10Info-r12 {
        scramblingId1-r12         INTEGER (0..503),
        scramblingId2-r12         INTEGER (0..503),
        qcl-Operation-r12         ENUMERATED {typeA, typeB}     OPTIONAL, -- Need ON
    }                                                           OPTIONAL, -- Need ON
    ...
}
Naics-ConfigID-r12 ::=            INTEGER (1..maxNaicsConfig-r12)
NAICS-p-a ::= ENUMERATED          {dB-12, dB-10.77, dB-9, dB-7.77, dB-6, dB-4dot77, dB-3,
                                  dB-1dot77, dB0, dB1, dB2, dB3}
NAICS-CSIRS-Config-r12 ::= SEQUENCE {
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503)
}
NAICS-CSIRS-NZP-Res-r12 ::= SEQUENCE {
    antennaPortsCount-r12         ENUMERATED {an1, an2, and, an8},
    resourceConfig-r12            INTEGER (0..31),
    subframeConfig-r12            INTEGER (0..154)
}
NAICS-CSIRS-ConfigZP-r12 ::= SEQUENCE {
    resourceConfigList-r11        BIT STRING (SIZE (16)),
    subframeConfig-r11            INTEGER (0..154)
}
maxNaicsConfig-r12                INTEGER ::= 6   -- Maximum number of interferers with assistance
information
maxCSIRS-NZP-Res-r12              INTEGER ::= 2   -- Maximum number of additional NZP CSI-RS
resource
                                                  configurations per interfering TM10 PDSCH
maxNAICS-PA-r12                   INTEGER ::= 4   -- Maximum number of power offsets per interfering
TM1-6 PDSCH
```

Example 4: RRC Signaling    35

The terms of the fourth example RRC signaling example provided immediately above may be defined or described in Rel-11 and as follows:

NAICS-AssistanceInfo field descriptions neighCellsNAICS-Info
This field contains assistance information, used by the UE to mitigate interference from PDSCH while performing data demodulation. The assistance information is associated with particular PDSCHs generated using scramblingId1, scramblingId2, or physCellId.
nLayer
A UE may assume that at most nLayer layers should be present on an interfering PDSCH that is transmitted using spatial multiplexing. If the interfering PDSCH uses 4 CRS ports and transmission mode 3, the UE may assume that the interfering PDSCH uses 4 layer spatial diversity or 2 layer spatial multiplexing. Value layer1 corresponds to 1 layer
and layer2 corresponds to 2 layers.
minPRBs
A UE may assume that the interfering PDSCH should be scheduled with minimum of minPRBs contiguous PRB pairs. The value of dl-Bandwidth corresponds to the UE's serving cell.
naics-SupportedTMs
A bitmap indicating the subset of transmission modesfor which the interfering PDSCH may be configured. Starting from the first/leftmost bit in the bitmap, the bits correspond to transmission modes 1, 2, 3, 4, 6, 8, and 9, respectively. The transmission modes are defined in TS 36.213 [23, 7.1].
pdsch-start
A UE may assume that the starting OFDM symbol of the interfering PDSCH should be pdsch-start. Values 1, 2, 3 are applicable when dl-Bandwidth for the serving cell identified by is greater than 10 resource blocks, values 2, 3, 4 are applicable when dl-Bandwidth for the serving cell is less than or equal to 10 resource blocks, see TS 36.211 [21, Table
6, 7-1].
physCellId
The physical cell ID associated with an interfering CRS and/or an interfering PDSCH.
crsPortsCount
The number of CRS ports that the UE can assume should be present on a cell transmitting the interfering PDSCH.
mbsfn-ConfList
The subframes the UE can assume should be configured for MBSFN transmission on a cell transmitting the interfering PDSCH.

-continued

NAICS-AssistanceInfo field descriptions naics-TM1to6Info
Parameters needed in case the interfering PDSCH uses one of transmission modes 1, 2, 3, 4, 6.
naics-p-a-List
The values of parameter $P_A$ that a wireless device can assume should be used for the interfering PDSCH if it uses one of transmission modes 1, 2, 3, 4, 6. Parameter $P_A$ is described in TS 36.213 [23, 5.2].
naics-p-b
The value of parameter $P_B$ that a wireless device can assume should be used for the interfering PDSCH if it uses one of transmission modes 1, 2, 3, 4, 6. Parameter $P_B$ is described in TS 36.213 [23, Table 5.2-1].
pmiList-TM46
A UE may assume that the precoding matrices in pmiList46 are the only ones used on an interfering PDSCH associated with naics-physCellId that is transmitted using 4 CRS ports and transmission modes 4 or 6. Parameter pmiList46 corresponds to $a_0 \ldots a_{16 \times nLayer-1}$ in codebookSubsetRestriction, as defined for transmission mode 4 with 4 antenna ports with $\upsilon$ = nLayer layers; see TS 36.213 section 7.2 and TS 36.211 section 6.3.4.2.3. A maximum of MaxNaicsPMI bits out of $a_0 \ldots a_{15}$ in pmiList-TM46 may be set to 1, and bits $\{a_4 a_5 a_6 a_7\}$ are set to $\{0000\}$. Rank 2 PMI matrices are subsets of rank 1 PMI matrices in pmiList-TM46: when nLayer indicates 2 layers, element $a_{16+i}$ with $0 \leq i \leq 15$ in pmiList-TM46 may be set to 1 only if $a_i$ is set to 1.
pmi-TM3
A UE may assume that the precoding matrix in pmi-TM3 should be the only one used on an interfering PDSCH associated with physCellId that is transmitted using 4 CRS ports and transmission modes 3. Parameter pmiTM3 corresponds to $a_0 \ldots a_3$ in codebookSubsetRestriction, as defined for transmission mode 3 with 4 antenna ports with $\upsilon$ = 2 layers; see TS 36.213 section 7.2 and TS 36.211 section 6.3.4.2.2. At most one bit out of $a_0 \ldots a_3$ in pmi-TM3 may be set to 1.
naics-CSIRS-Info
Identifies CSI-RS parameters a UE can assume should be used for an interfering PDSCH.
p-C
The value of parameter $P_c$ that a wireless device can assume should be used for the interfering transmission mode 9 or 10 PDSCH associated with the CSI-RS identified by CSI-RS-NZP, see TS 36.213 [23, 7.2.5].
csi-RS-NZP
Identifies a CSI-RS the UE can assume should be transmitted by the interferer if it is configured to receive transmission mode 9 or 10.
nzp-Re-List
Identifies REs of the interferer that the UE can assume should not be occupied by the interfering PDSCH and may contain a CSI-RS.
csi-RS-ZP
Identifies REs of the interferer that the UE can assume should be occupied by zero power CSI-RS.
naics-TM10Info
Identifies an interfering TM10 PDSCH.
scramblingId1, scramblingId2
Parameter: $n_{ID}^{DMRS}$, used to transmit an interfering PDSCH with transmission mode 10, see TS 36.211 section 6.10.3.1.
qcl-Operation
Indicates the quasi co-location behaviour that a UE can assume is used for the interfering transmission mode 10 PDSCH, type A and type B, as described in TS 36.213 [23, 7.1.10], with the CRS identified by physCellId and/or the CSI-RS identified by CSI-RS-NZP.
maxNaicsConfig
Maximum number of interferers for which NAICS assistance information is provided.
maxCSIRS-NZP-Res
Maximum number of CSI-RS configurations that can be used to indicate which REs of an interferer should not contain PDSCH.
maxNAICS-PA
Maximum number of values of naics-p-a that the UE can assume should be used.

| Conditional presence | Explanation |
| --- | --- |
| naicsQCL | The field is mandatory present if the field qcl-Operation is present, otherwise the field is optionally present, need ON |

NAICS-CSIRS-Config field descriptions

Parameter: Pseudo-random sequence generator parameter, $n_{ID}$, see TS 36.213 [23, 7.2.5].

NAICS-CSIRS-Config field descriptions antennaPortsCount
Parameter represents the number of antenna ports used for transmission of the CSI reference signal where value an1 corresponds to 1 antenna port, an2 to 2 antenna ports and so on, See TS 36.211 [21, 6.10.5].
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
scramblingIdentity NAICS-CSIRS-NZP-Res field descriptions antennaPortsCount
Parameter represents the number of antenna ports used for transmission of the CSI reference signal where value an1 corresponds to 1 antenna port, an2 to 2 antenna ports and so on, See TS 36.211 [21, 6.10.5].
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].

| NAICS-CSIRS-ConfigZP field descriptions |
| --- |
| resourceConfigList<br>Parameter: ZeroPowerCSI-RS, see TS 36.213 [23, 7.2.7].<br>subframeConfig<br>Parameter: $I_{CSI-RS}$, see TS 36.211 [21, table 6.10.5.3-1]. |

Again, while RRC signaling may be used to provide NAICS assistance information, other embodiments may use a mixture of physical and higher layer specifications. Also, NAICS assistance information can be extended to contain other IEs used to assist NAICS reception.

Figure 6:
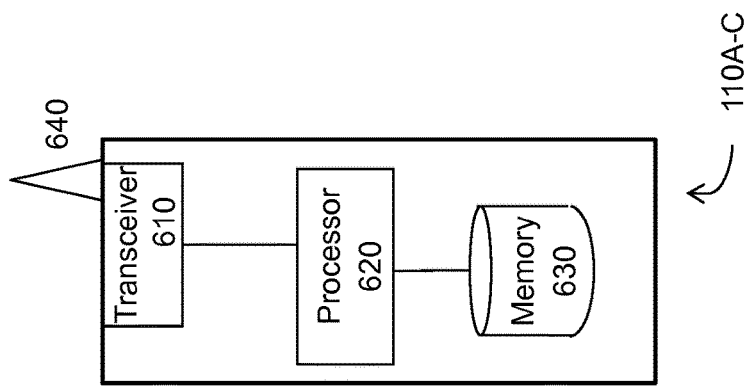
FIG. 6 is a block diagram illustrating a wireless device, according to certain embodiments.

FIG. 6 is a block diagram illustrating certain embodiments of a wireless device 110A-C. Examples of wireless device 110A-C include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110A-C may also be referred to as user equipment (UE), a station (STA), a device, or a terminal in some embodiments. Wireless device 110A-C includes transceiver 610, processor 620, and memory 630. In some embodiments, transceiver 610 facilitates transmitting wireless signals to and receiving wireless signals from radio network node 115A-C (e.g., via antennas 640), processor 620 executes instructions to provide some or all of the functionality described above as being provided by wireless device 110A-C, and memory 630 stores the instructions executed by processor 620.

Processor 620 may include any suitable combination of hardware and software implemented in one or more modules to execute instructions and manipulate data to perform some or all of the described functions of wireless device 110A-C. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110A-C may include additional components beyond those shown in FIG. 6 that may be responsible for providing certain aspects of the wireless device's functionality, including any of the functionality described above and/or any additional functionality (including any functionality necessary to support the solution described above).

Figure 7:
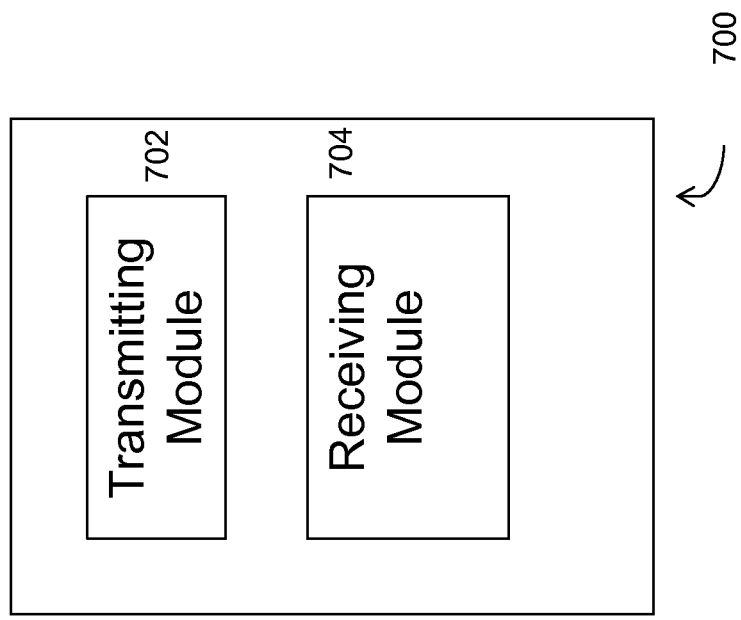
FIG. 7 is a block diagram illustrating a computer networking virtual apparatus, according to certain embodiments.

In certain embodiments, wireless device 110A-C may operate as a computer networking virtual apparatus. FIG. 7 is a block diagram illustrating a computer networking virtual apparatus 700. As depicted, the virtual apparatus 700 includes at least one receiving module 702 and at least one identifying module 704. The receiving module 702 may perform the receiving functions of wireless device 110A-D, as described herein. For example, receiving module 702 may receive a first physical channel from first network node 115A. As another example, receiving module 702 may receive a plurality of configuration indications from the first network node 115A. In a particular embodiment, each of the configuration indications may include a physical cell identity, antenna port information for a cell-specific CRS, and an identification of a CSI-RS.

Identifying module 704 may perform the identifying functions of virtual apparatus 700, as described herein. For example, identifying module 704 may identify a second physical channel transmitted by a second network node 115E that interferes with the first physical channel. In a particular embodiment, the second physical channel may be identified based at least in part on a first configuration indication and a second configuration indication. The first configuration indication and the second configuration indication may include a same physical cell identity and same antenna port information.

Figure 8:
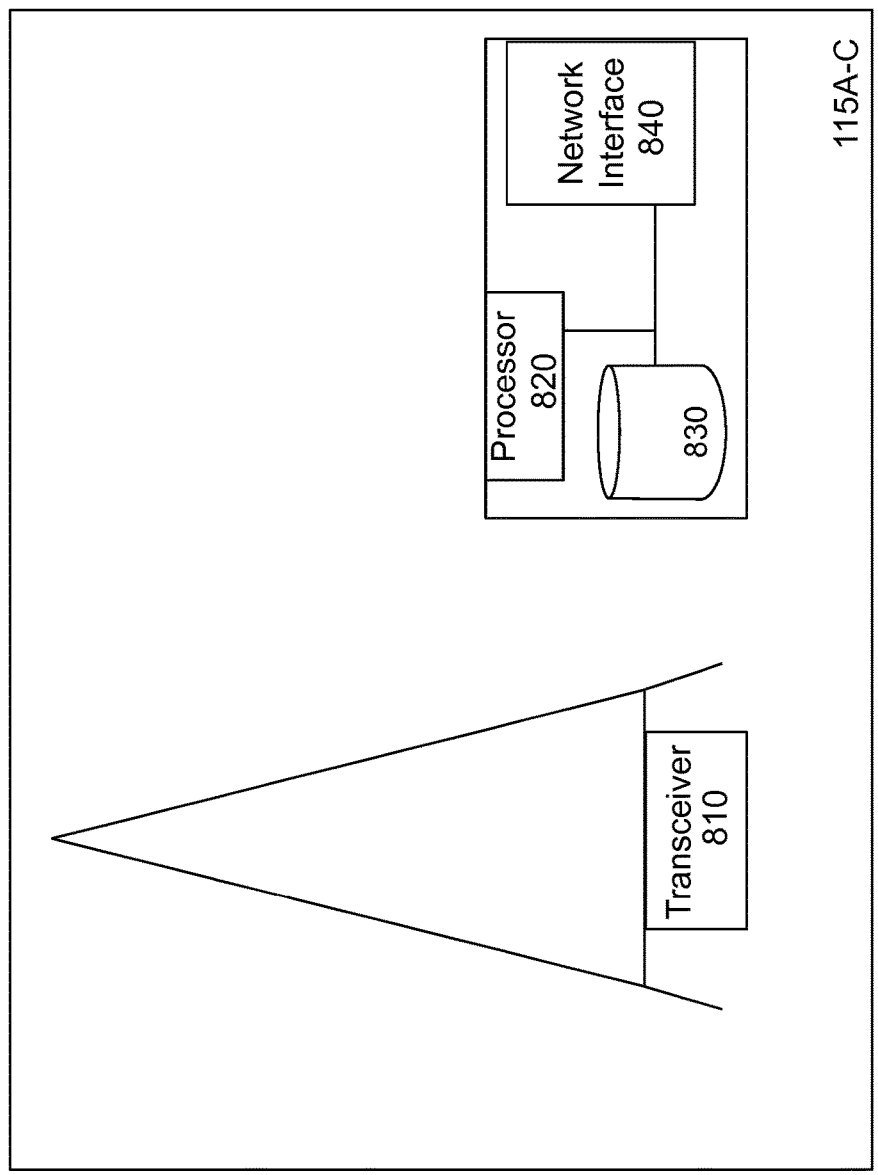
FIG. 8 is a block diagram illustrating a radio network node, according to certain embodiments.

FIG. 8 is a block diagram illustrating certain embodiments of a radio network node 115A-C. Examples of radio network node 115A-C include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115A-C may be deployed throughout network 100 as a homogenous deployment, heterogeneous deployment, or mixed deployment. A homogenous deployment may generally describe a deployment made up of the same (or similar) type of radio network nodes 115A-C and/or similar coverage and cell sizes and inter-site distances. A heterogeneous deployment may generally describe deployments using a variety of types of radio network nodes 115A-C having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115A-C may include one or more of transceiver 810, processor 820, memory 830, and network interface 840. In some embodiments, transceiver 810 facilitates transmitting wireless signals to and receiving wireless signals from wireless device 110A-C (e.g., via an antenna), processor 820 executes instructions to provide some or all of the functionality described above as being provided by a radio network node 115, memory 830 stores the instructions executed by processor 820, and network interface 840 communicates signals to backend network components, such as a gateway, switch, router, Internet, Public Switched Telephone Network (PSTN), core network nodes 130, radio network controllers 120, etc.

Processor 820 may include any suitable combination of hardware and software implemented in one or more modules to execute instructions and manipulate data to perform some or all of the described functions of radio network node 115A-C. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for radio network node 115A-C, send output from radio network node 115A-C, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of radio network node 115A-C may include additional components beyond those shown in FIG. 8 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 9:
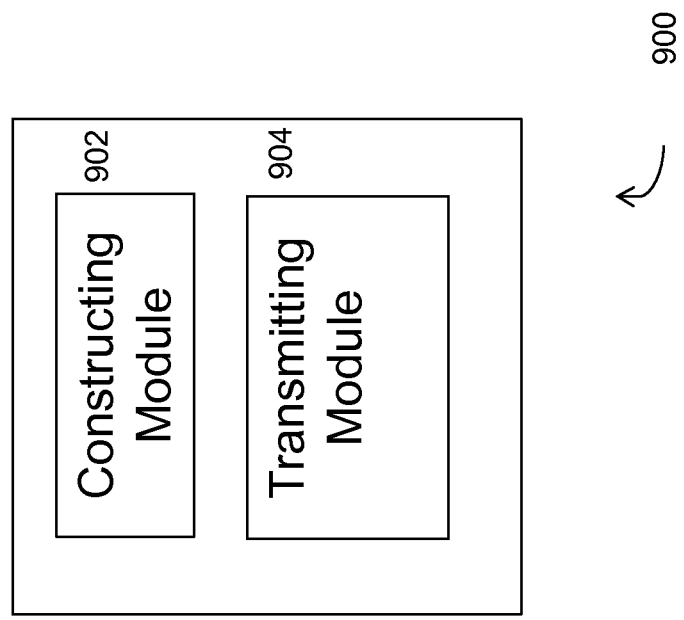
FIG. 9 is a block diagram illustrating another computer networking virtual apparatus, according to certain embodiments.

In certain embodiments, network node 115A-C may operate as a computer networking virtual apparatus. FIG. 9 is a block diagram illustrating a computer networking virtual apparatus 900. As depicted, the virtual apparatus 900 includes at least one constructing module 902 and at least one transmitting module 904. The constructing module 902 may perform the constructing functions of wireless device 110A-C, as described herein. For example, constructing module 902 may construct configuration indications. In a particular embodiment, each configuration indication includes a physical cell identity, antenna port information for a CRS and an identification of a CSK-RS.

The at least one transmitting module 904 may transmit a first configuration indication and a second configuration indication to the first wireless device 110A. The at least one transmitting module 904 may also transmit a first physical channel to the first wireless device 110A. In a particular embodiment, the second physical channel transmitted from second network node 115B that interferes with the first physical channel may be identifiable at least in part based on the first or second configuration indication. In a particular embodiment, the first configuration indication and the second configuration indication may include a same physical cell identity and same antenna port information.

Figure 10:
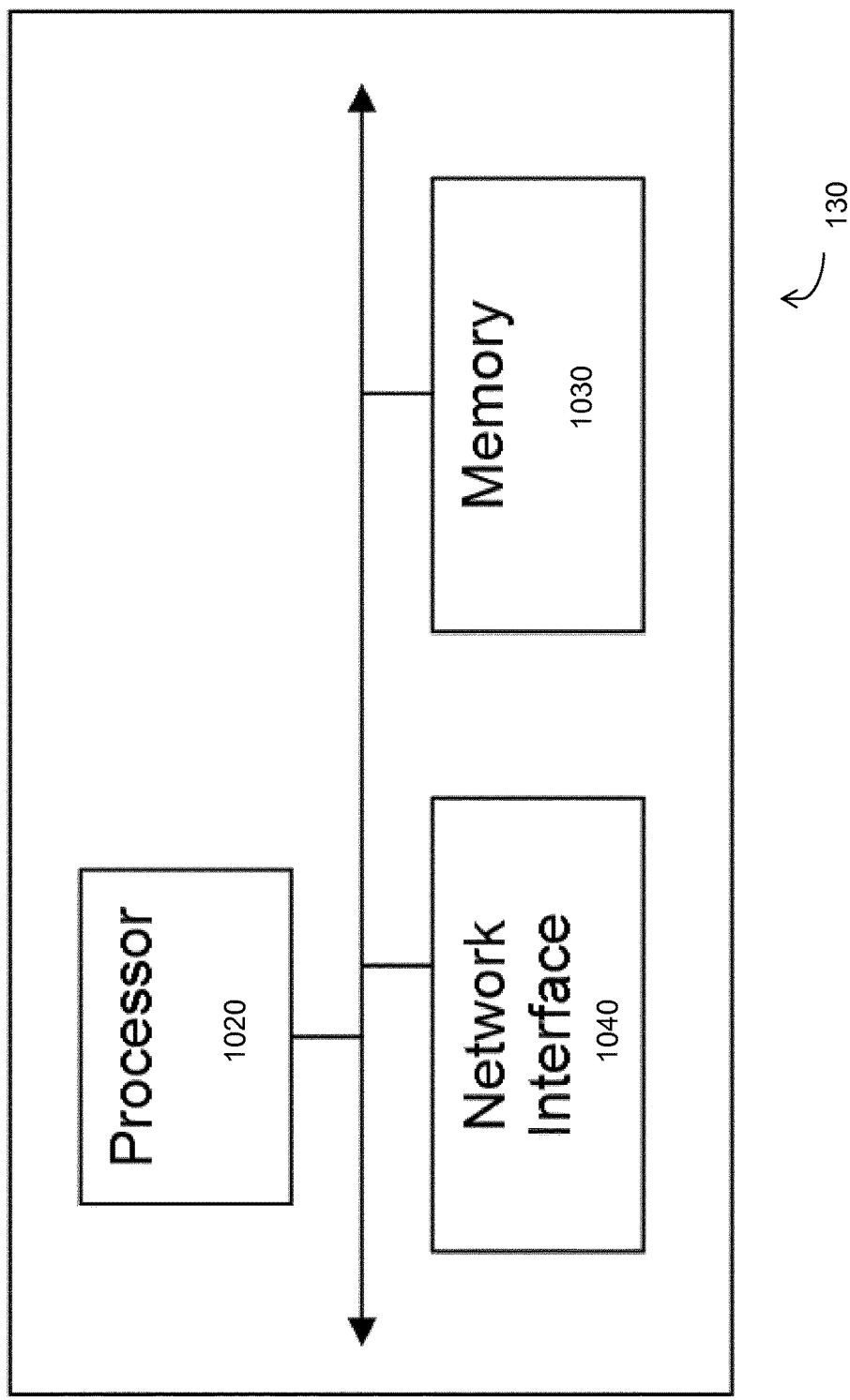
FIG. 10 is a block diagram illustrating certain embodiments of a core network node.

FIG. 10 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to a suitable node, such as a gateway, switch, router, Internet, Public Switched Telephone Network (PSTN), radio network nodes 115A-C, radio network controllers 120, core network nodes 130, etc.

Processor 1020 may include any suitable combination of hardware and software implemented in one or more modules to execute instructions and manipulate data to perform some or all of the described functions of the network node. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, the systems and methods allow for deployments of NAICS assistance information where any number of transmission points can share a physical cell ID and any number of CCIDs can be associated with a transmission point or cell. Still another advantage may be that wireless devices may rank the power of interfering transmission points transmitting TM9 or TM10 in a more accurate way than relying solely on measurements of a CSI-RS. Additionally, the network may control when the wireless devices use the CSI-RS for ranking purposes. Still another advantage may be that assistance signaling for blanked non-zero power CSI-RS may require less overhead. Additionally, the disclosed systems and methods may allow the wireless device to determine which resource elements of an interferer are not occupied by a PDSCH and, thus, may improve NAICS cancellation efficiency. Still another technical advantage may be providing assistance information for all supported NAICS transmission modes in a unified manner.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order. For example, in one alternative embodiment, a method for identifying interfering physical channel configurations and of identifying cell-specific reference signals (CRSs) may include:

constructing a plurality of configuration indications, each configuration may include at least:
a physical cell identity,
a number of antenna ports for cell-specific reference signal, wherein:
an identification of a channel state information reference signal (CSI-RS);
Signaling a first and a second configuration of the plurality of configuration indications to the first wireless device;
Optionally, the CRS may be transmitted by a plurality of transmission points;
Optionally, the CRS may be transmitted on the same antenna ports with physical channels that are transmitted by an interfering transmission point;
Optionally, resource elements that can contain the CRS do not contain an interfering physical channel;
Optionally, a first wireless device may assume that the CSI-RS and the interfering physical channel should be transmitted by the interfering transmission point;
Optionally, the CSI-RS may not be transmitted on the same antenna ports as the interfering physical channel;
Optionally, the first and second configurations may contain the same value of physical cell identity and the same value of CRS ports; and
Optionally, the first and second configurations can identify different CSI-RSs.

As another example embodiment, a method performed by a wireless device for characterizing power form an interfering transmission point may include:
Receiving a channel state information reference signal (CSI-RS) sequence identifier;
Receiving an assumed power ratio of a physical channel's power to the power of the CSI-RS that may be used when second wireless device served by the interfering transmission point derives channel state information feedback using the CSI-RS;
Optionally, a CSI-RS corresponding to the CSI-RS sequence identifier may be transmitted by the interfering transmission point;
Optionally, the CSI-RS may not be transmitted on antenna ports that carry physical channels.

In still another example embodiment, a method of indicating a configuration of an interfering physical channel transmitted from a first transmitter may include:
Providing an indication of physical layer resources that do not contain the interfering physical channel, but may contain a channel state information reference signal (CSI-RS) from a second transmitter, wherein:
the indication does not comprise a CSI-RS sequence identifier;
the CSI-RS cannot be transmitted on antenna ports that carry a physical channel from the second transmitter; and
the physical layer resources are identified at least in part by a number of antenna ports.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

While the following terms may be in general use in the art, they are particularly relevant to the embodiments and are therefore elaborated here (however such elaborations are not intended to be limiting):

An LTE downlink physical signal ('physical signal' as used herein) corresponds to a set of resource elements used by the physical layer but does not carry information originating from higher layers. Two downlink physical signals are defined: reference signals, and synchronization signals.

An LTE downlink physical channel ('physical channel' as used herein) corresponds to a set of resource elements carrying information originating from higher layers. LTE physical channels include PDSCH, PBCH, PMCH, PCFICH, PDCCH, PHICH, and EPDCCH.

An LTE antenna port is defined such that the radio propagation channel over which a symbol on the antenna port is conveyed can be inferred from the radio propagation channel over which another symbol on the same antenna port is conveyed.

Two antenna ports are said to be quasi co-located if the large-scale properties of the radio propagation channel over which a symbol on one antenna port is conveyed can be inferred from the radio propagation channel over which a symbol on the other antenna port is conveyed. The large-scale properties include one or more of delay spread, Doppler spread, Doppler shift, average gain, and average delay.

Reference signals are physical signals that are transmitted on the same antenna port as a physical channel and/or can be used to estimate the radio propagation channel for the physical channel. LTE downlink reference signals can be generated using a reference signal sequence and a mapping to resource elements. The reference signal sequence is initialized with a value or values, where the value(s) may be predetermined or signaled to the UE. The value or values used to initialize the reference signal sequence are herein referred to as reference signal sequence identifiers or scrambling identities.

An LTE channel state information reference signal (CSI-RS) is a reference signal that may be used by a UE to determine channel state information (CSI) or channel quality information (CQI) feedback. It is different from a cell-specific reference signal (CRS) and from a demodulation reference signal (DMRS) in that it is not transmitted on the same antenna ports as a physical channel. A CSI-RS sequence identifier is its pseudo-random sequence generator parameter, $N_{ID}^{CSI}$, as is described in, and can be provided to a UE using RRC signaling using the scramblingIdentity parameter contained in IEs such as CSI-RS-ConfigNZP In the context of LTE, spatial multiplexing may be defined as a mode of transmission of a physical channel in which independent information bearing symbols can be transmitted in the same resource elements but using distinct antenna ports, or equivalently, multiple codewords can be transmitted on different layers of the physical channel.

Spatial multiplexing can be contrasted with spatial diversity, which can be defined as a mode of transmission of a physical channel in which distinct antenna ports are also used, but if the information bearing symbols occupy the same resource, they are interdependent (through e.g. space-time coding) or information bearing symbols occupy distinct resource elements in order to avoid interference (as in frequency selection transmit diversity). Equivalently, spatial diversity may be defined as transmitting a single codeword on multiple layers.

In the above description, we refer to an antenna covering a certain geographical area in a certain manner as a point, or more specifically as a Transmission Point (TP). PDSCHs transmitted from TPs can be associated with a cell ID, in which case the cell ID may be unique to one TP or TPs may use the same cell ID. The latter case is referred to as 'shared cell' operation.

Abbreviations used in the preceding description include:
CCID Configurable Cell IDentity
CRS Cell-specific Reference Signal
CRS-IC CRS Interference Cancellation
CSI Channel State Information
CSI-RS Channel State Information Reference Signal
DMRS Demodulation Reference Signal
DPS Dynamic Point Selection
eNB enhanced Node B
EPDCCH Enhanced Physical Downlink Control Channel
EPRE Energy Per Resource Element
ID Identity
IE Information Element
NAICS Network Assisted Interference Cancellation and Suppression
NZP Non-Zero Power
PBCH Physical Broadcast Channel
PCFICH Physical Control Format Indicator Channel
PDCCH Physical Downlink Control Channel
PDSCH Physical Downlink Shared Channel
PHICH Physical Hybrid ARQ Indicator Channel
PMCH Physical Multicast Channel
PMI Precoding Matrix Indication
RE Resource Element
RRC Radio Resource Control
SFBC Space Frequency Block Coding
TM PDSCH Transmission Mode
TP Transmission Point
UE User Equipment
ZP Zero Power

The invention claimed is:

1. A method by a first network node for identifying interfering physical channel configurations and cell-specific reference signals (CRSs) for the characterization of dynamic interferers, the method comprising:
constructing a plurality of configuration indications, each configuration indication comprising:
a physical cell identity;
antenna port information for a cell-specific reference signal (CRS); and
an identification of a channel state information reference signal (CSI-RS); and
transmitting, to a first wireless device, a first configuration indication and a second configuration indication of the plurality of configuration indications; and
transmitting, by the first network node, a first physical channel to the first wireless device, and
wherein a second physical channel transmitted from a second network node that interferes with the first physical channel is identifiable at least in part based on the first configuration indication or the second configuration indication,
wherein the first configuration indication and the second configuration indication include a same physical cell identity and a same antenna port information, and
wherein a plurality of resource elements that can include the CRS do not include the second physical channel.

2. The method of claim 1, wherein the first configuration indication and the second configuration indication identify a same CSI-RS.

3. The method of claim 1, wherein the first configuration indication and the second configuration indication identify different CSI-RS.

4. The method of claim 1, wherein each configuration indication further comprises:
an assumed power ratio of a first power level to a second power level, the first power level being associated with the second physical channel, the second power level being associated with the CSI-RS of a second wireless device served by the second network node when the second wireless device derives channel state information feedback using the CSI-RS.

5. The method of claim 4, wherein the identification of the CSI-RS comprises a CSI-RS sequence identifier transmittable by the second network node.

6. The method of claim 1, wherein the CRS is transmitted by a plurality of transmission points.

7. The method of claim 1, wherein the CRS is transmitted on at least one same antenna port with a physical channel that is transmitted by an interfering transmission point.

8. The method of claim 1, wherein the CSI-RS is used for channel state information feedback by a second wireless device served by the second network node.

9. The method of claim 1, wherein the CSI-RS is transmitted on different antenna ports with physical channels as an interfering physical channel by an interfering transmission point.

10. A first network node for identifying interfering physical channel configurations and cell-specific reference signals (CRSs) for the characterization of dynamic interferers, the network node comprising:
a memory for storing configuration indication information; and
at least one processor in communication with the memory, the at least one processor operable to construct a plurality of configuration indications, each configuration indication comprising:
a physical cell identity;
antenna port information for a cell-specific reference signal (CRS); and
an identification of a channel state information reference signal (CSI-RS); and
a transceiver operable to:
transmit, to a first wireless device, a first configuration indication and a second configuration indication of the plurality of configuration indications, and
transmit a first physical channel to the first wireless device, wherein a second physical channel transmitted from a second network node that interferes with the first physical channel is identifiable at least in part based on the first configuration indication or the second configuration indication, and wherein the first configuration indication and the second configuration indication include a same physical cell identity and a same antenna port information, and wherein a plurality of resource elements that can include the CRS do not include an interfering physical channel.

11. The network node of claim 10, wherein the first configuration indication and the second configuration indication identify a same CSI-RS.

12. The network node of claim 10, wherein the first configuration indication and the second configuration indication identify different CSI-RS.

13. The network node of claim 10, wherein each configuration indication further comprises:
an assumed power ratio of a first power level to a second power level, the first power level being associated with the second physical channel, the second power level being associated with the CSI-RS of a second wireless device served by the second network node when the second wireless device derives channel state information feedback using the CSI-RS.

14. The network node of claim 13, wherein the identification of the CSI-RS comprises a CSI-RS sequence identifier transmittable by the second network node.

15. The network node of claim 10, wherein the CRS is transmitted by a plurality of transmission points.

16. The network node of claim 10, wherein the CRS is transmitted on at least one same antenna port with the second physical channel that is transmitted by an interfering transmission point.

17. The network node of claim 10, wherein the CSI-RS is used for channel state information feedback by a second wireless device served by the second network node.

18. The network node of claim 10, wherein the CSI-RS is transmitted on different antenna ports with physical channels as an interfering physical channel by an interfering transmission point.

19. A first wireless device for identifying interfering physical channel configurations and cell-specific reference signals (CRSs) for the characterization of dynamic interferers, the first wireless device comprising:
a memory for storing configuration indication information; and
a transceiver operable to:
receive, from a first network node, a first physical channel;
receive, from the first network node, a plurality of configuration indications, each of the plurality of configuration indications comprising:
a physical cell identity;
antenna port information for a cell-specific reference signal (CRS); and
an identification of a channel state information reference signal (CSI-RS); and
at least one processor in communication with the memory and the transceiver,
the at least one processor operable to identify a second physical channel transmitted by a second network node that interferes with the first physical channel, the second physical channel identified based at least in part on a first configuration indication and a second configuration indication of the plurality of configuration indications, the first configuration indication and the second indication including a same physical cell identity and a same antenna port information, wherein a plurality of resource elements that can include the CRS do not include an interfering physical channel.

20. The first wireless device of claim 19, wherein each configuration indication further comprises:
an assumed power ratio of a first power level to a second power level, the first power level being associated with the first physical channel, the second power level being associated with the CSI-RS of a second wireless device served by the second network node when a second wireless device derives channel state information feedback using the CSI-RS.

21. The first wireless device of claim 20, wherein the identification of the CSI-RS comprises a CSI-RS sequence identifier received from the second network node.

22. The first wireless device of claim 19, wherein the CRS is transmitted on at least one same antenna port with the second physical channel that is transmitted by an interfering transmission point.

23. The first wireless device of claim 19, wherein the CSI-RS is used for channel state information feedback by a second wireless device served by the second network node.

24. The first wireless device of claim 19, wherein the CSI-RS is transmitted on different antenna ports with physical channels as an interfering physical channel by an interfering transmission point.

25. A method by a first wireless device for identifying interfering physical channel configurations and cell-specific reference signals (CRSs) for the characterization of dynamic interferers, the method comprising:
receiving, from a first network node, a first physical channel;
receiving, from the first network node, a plurality of configuration indications, each of the plurality of configuration indications comprising:
a physical cell identity;
antenna port information for a cell-specific reference signal (CRS); and
an identification of a channel state information reference signal (CSI-RS); and
identifying a second physical channel transmitted by a second network node that interferes with the first physical channel, the second physical channel identified based at least in part on a first configuration indication and a second configuration indication of the plurality of configuration indications, the first configuration indication and the second indication including a same physical cell identity and a same antenna port information,
wherein a plurality of resource elements that can include the CRS do not include the second physical channel.

26. The method of claim 25, wherein each configuration indication further comprises:
an assumed power ratio of a first power level to a second power level, the first power level being associated with the first physical channel, the second power level being associated with the CSI-RS of a second wireless device served by the second network node when a second wireless device derives channel state information feedback using the CSI-RS.

27. The method of claim 26, wherein the identification of the CSI-RS comprises a CSI-RS sequence identifier received from the second network node.

28. The method of claim 25, wherein the CRS is transmitted on at least one same antenna port with the second physical channel that is received from an interfering transmission point.

29. The method of claim 25, wherein the CSI-RS is used for channel state information feedback by a second wireless device served by the second network node.

30. The method of claim 25, wherein the CSI-RS is transmitted on different antenna ports with physical channels as an interfering physical channel by an interfering transmission point.

* * * * *